(12) United States Patent
Sisk et al.

(10) Patent No.: US 10,489,361 B2
(45) Date of Patent: Nov. 26, 2019

(54) SYSTEM AND METHODS FOR CLEANSING AUTOMATED ROBOTIC TRAFFIC FROM SETS OF USAGE LOGS

(71) Applicant: Camelot UK Bidco Limited, London (GB)

(72) Inventors: Jacob Sisk, Orinda, CA (US); James Pringle, Philadelphia, PA (US); Nina Chang, Wilmington, DE (US)

(73) Assignee: Camelot UK Bidco Limited, London (GB)

( * ) Notice: Subject to any disclaimer, the term of this patent is extended or adjusted under 35 U.S.C. 154(b) by 510 days.

(21) Appl. No.: 14/605,134

(22) Filed: Jan. 26, 2015

(65) Prior Publication Data

US 2015/0213065 A1    Jul. 30, 2015

Related U.S. Application Data

(60) Provisional application No. 61/931,973, filed on Jan. 27, 2014.

(51) Int. Cl.
*G06F 16/215* (2019.01)
*G06F 16/35* (2019.01)
(Continued)

(52) U.S. Cl.
CPC ........ *G06F 16/215* (2019.01); *G06F 16/2358* (2019.01); *G06F 16/353* (2019.01); *G06F 21/552* (2013.01); *G06Q 10/10* (2013.01)

(58) Field of Classification Search
CPC ............. G06F 17/30707; G06F 16/285; G06F 11/3438; G06F 16/2358; G06F 2201/86;
(Continued)

(56) References Cited

U.S. PATENT DOCUMENTS 8,244,752 B2 * 8/2012 Buehrer .................. H04L 47/10
707/769
2008/0313115 A1    12/2008 Galvin
(Continued)

FOREIGN PATENT DOCUMENTS

EP    2525299 A1    11/2012

OTHER PUBLICATIONS

Omer et al. "Distinguishing Humans from Bots in web Search logs" copyright Oct. 25, 2010 ACM.*
(Continued)

*Primary Examiner* — Jeff A Burke
*Assistant Examiner* — Cindy Nguyen
(74) *Attorney, Agent, or Firm* — McCarter & English, LLP

(57) ABSTRACT

Exemplary embodiments of the present disclosure provide for cleansing data generated by one or more servers in response to database interactions resulting from an automated software robot interacting with the one or more servers via a telecommunications network. Log entries in usage logs corresponding to events during a session can be analyzed to determine relationships between events and the usage logs can be classified based on the relationships as either corresponding to human behavior or automated software robot behavior. Usage logs corresponding to automated software robot behavior can be removed from further analysis.

19 Claims, 12 Drawing Sheets

(51) Int. Cl.
  *G06F 16/23* (2019.01)
  *G06Q 10/10* (2012.01)
  *G06F 21/55* (2013.01)

(58) Field of Classification Search
  CPC .. H04L 67/22; H04L 63/1425; H04L 63/1416
  See application file for complete search history.

(56) References Cited

U.S. PATENT DOCUMENTS

| | | | |
|---|---|---|---|
| 2009/0094311 A1 | 4/2009 | Awadallah et al. | |
| 2009/0144263 A1 | 6/2009 | Brady | |
| 2010/0082800 A1 | 4/2010 | Wei et al. | |
| 2010/0115621 A1 | 5/2010 | Staniford et al. | |
| 2010/0150393 A1 | 6/2010 | Ni et al. | |
| 2010/0262457 A1 | 10/2010 | House | |
| 2011/0023115 A1* | 1/2011 | Wright | G06F 21/552 726/22 |
| 2011/0131652 A1 | 6/2011 | Robinson et al. | |
| 2012/0117649 A1 | 5/2012 | Holloway et al. | |
| 2012/0144020 A1* | 6/2012 | Carey | H04L 43/0823 709/224 |
| 2012/0191693 A1 | 7/2012 | Alexander | |
| 2012/0323677 A1* | 12/2012 | Bottou | G06N 7/005 705/14.45 |
| 2013/0085993 A1 | 4/2013 | Li et al. | |
| 2013/0198203 A1 | 8/2013 | Bates et al. | |
| 2014/0075558 A1 | 3/2014 | Ward et al. | |
| 2014/0320392 A1 | 10/2014 | Chizeck et al. | |
| 2015/0075558 A1 | 3/2015 | Hsia | |

OTHER PUBLICATIONS

International Search Report and Written Opinion dated Sep. 25, 2015 from associated PCT International Patent Application PCT/IB2015/001045.

International Search Report and Written Opinion from related international patent application No. PCT/US2017/038330 dated Sep. 11, 2017.

Non-Final Office Action from related U.S. Appl. No. 15/190,709 dated Jul. 20, 2018.

Final Office Action from related U.S. Appl. No. 15/190,709 dated Jan. 15, 2019.

Advisory Action Before the Filing of an Appeal Brief from related U.S. Appl. No. 15/190,709 dated Apr. 23, 2019.

First Examination Report from related Australian Patent Application No. 2015225870 dated Sep. 3, 2019.

* cited by examiner

| Time | Action | Target |
|---|---|---|
| 01:15:38 | event_alum_query:general | ??????=(Rapid solidification and mechanical allying techniques applied to CuCr alloys) |
| 08:16:13 | event_alum_query:general | ??????=(Stevens, J., Ahmad, M., and Ruddell, S.) |
| 08:16:35 | event_alum_query:general | ??????=(Stevens, J.) |
| 08:17:46 | event_alum_query:ra_refine_summary | ??????=(Stevens, J.) |
| 08:18:28 | event_alum_query:ra_refine_summary | ??????=(Stevens, J.) |
| 08:18:46 | event_alum_view:abstract_view | WOS:74474200009 |
| 08:18:50 | event_alum_view:full_view | WOS:74474200009 |
| 08:19:35 | event_alum_link:full_text | WOS:77552200014 |
| 08:20:46 | event_alum_query:general | ??????=(Swallow, S.K) |
| 08:21:48 | event_alum_query:general | ??????=(Sedjo, R.A) |
| 08:23:56 | event_alum_query:general | ??????=(Swallow, S.K) AND ??????=(Sedjo, R.A) |
| 08:24:25 | event_alum_query:general | ??????=(Sikod, F.) |
| 08:25:08 | event_alum_query:general | ??????=(Sedjo, R) |
| 08:25:56 | event_alum_query:ra_refine_summary | ??????=(Sedjo, R) |
| 08:28:51 | event_alum_query:general | ??????=(Sedjo, R) AND ??????=(eco-label) |
| 08:30:28 | event_alum_query:general | ??????=(Schwarzbauer, P) |
| 08:31:17 | event_alum_print | WOS:171814300004 |
| 08:32:09 | event_alum_query:general | ??????=(Salim, E) |
| 08:33:21 | event_alum_query:general | ??????=(Salim, E) AND ??????=(Djalins, U.) |
| 08:34:00 | event_alum_query:general | ??????=(Ozanne, L) |
| 08:34:32 | event_alum_query:ra_refine_summary | ??????=(Ozanne, L) |

Fig. 3

SYSTEM AND METHODS FOR CLEANSING AUTOMATED ROBOTIC TRAFFIC FROM SETS OF USAGE LOGS

RELATED APPLICATIONS

The present application claims priority to U.S. Provisional Patent Application Ser. No. 61/931,973, filed on Jan. 27, 2014, the entirety of which is incorporated herein by reference.

TECHNICAL FIELD

Exemplary embodiments of the present disclosure relate to identifying data generated in response to robotic traffic and cleansing the data generated from robotic traffic to facilitate accurate and trustworthy metrics and/or altmetrics associated with works in an information retrieval system.

BACKGROUND

Researchers often seek to identify important and interesting new discoveries in their fields, and then use these new discoveries as quickly as possible in their work. The task of making new discoveries is increasingly difficult as the volume of research literature increases exponentially. Traditional measures of research impact, such as citation counts, operate at low velocities, taking years to accrue, and may not provide enough information to researchers about newly published works. Instead, researchers are turning to usage and other alternative metrics ("altmetrics") to provide higher velocity indicators of interest to guide them, particularly in the pre-citation period, where a newly published work has not had time to accrue traditional measures of research impact. Providing these measures from aggregated or metadata databases is particularly challenging because usage is increasingly driven by automated machines—robotic traffic—that does not accurately reflect the interest or importance of individual research artifacts.

Within the academic and scientific literature space, one conventional approach to distinguishing between human and robotic traffic is to utilize pre-established identifications of non-human users, likely by way of IP addresses of servers deploying web-crawlers and other computer-implemented scripts. Research sessions linked to such IP addresses are flagged as non-human sessions and are removed from further analysis. Requiring pre-identification of non-human users is not a plausible or sustainable solution to robotic traffic due to the complexity of human and non-human interactions in these research sessions, where humans may, for example, utilize automated scripts in an ad hoc manner to complete repetitive tasks.

SUMMARY

Exemplary embodiments of the present disclosure provide for the ability to distinguish between automated and human usage/traversal in information retrieval system consisting of metadata and/or works (written or otherwise). Usage logs for metadata databases show a variety of information-seeking behaviors by both human and machine actors. To effectively interpret the usage logs, exemplary embodiments can mine the usage logs in a manner that carefully distinguishes various types of behavior and accurately selects the events from the usage logs that indicate a true level of research interest in a work from human users. Mining usage logs in accordance with exemplary embodiments of the present disclosure can advantageously provide indicators not only of current research interests, but also the emergence of new research priorities that will inform the future evolution of the science, technology, and scholarship.

Exemplary embodiments of the present disclosure are directed to systems and methods that are capable of identifying, classifying, and cleansing of usage logs to remove those usage logs that are associated with automated software robot behavior from further analysis based on patterns and/or characteristics of data in the usage logs. A model of intentional behavior can be used to identify and classify usage logs based on a theory that human users invest time in structuring, performing, or refining a search query, viewing a result list, or navigating pages (e.g., investment events) to receive an expected outcome on which to act. Such acts can include printing, sharing. saving, and/or opening a record or document (e.g., payoff events) produced from the investment events. Various mathematical techniques are disclosed herein to establish temporal and other relationships among investment events and payoff/outcome events to assign the correct degree of intentionality.

In accordance with embodiments of the present disclosure, a method of cleansing data generated by one or more servers is disclosed. The data to be cleansed is generated in response to database interactions resulting from an automated software robot or script interacting with the one or more servers via a telecommunications network. The method includes retrieving a usage log from a non-transitory computer-readable medium. The usage log includes log entries corresponding to events that occurred during a session between a user device and the one or more servers. The method also includes analyzing the log entries in response to execution of a log analyzer to determine a relationship between the events that occurred during the session, executing the log analyzer to classify the usage log based on the relationship as either corresponding to human behavior or automated software robot behavior, and determining whether to exclude the usage log from generation of a metric in response to classifying the usage log.

In accordance with embodiments of the present disclosure, a system for cleansing data generated by one or more servers is disclosed. The data to be cleansed is generated in response to database interactions resulting from an automated software robot interacting with the one or more servers via a telecommunications network. The system includes a usage log database and one or more servers. The usage log database includes usage logs associated with sessions between user devices and the one or more servers, and the usage logs include log entries corresponding to events that occurred during sessions between user devices and the one or more servers. The one or more servers are programmed to retrieve the usage logs from usage log database, analyze the log entries in response to execution of a log analyzer to determine a relationship between the events that occurred during the session, execute the log analyzer to classify the usage log based on the relationship as either corresponding to human behavior or automated software robot behavior, and determine whether to exclude the usage log from generation of a metric in response to classifying the usage log.

In accordance with embodiments of the present disclosure, a non-transitory computer-readable medium storing instructions is disclosed, wherein execution of the instructions by a processing device causes the processing device to retrieve the usage logs from usage log database, analyze the log entries in response to execution of a log analyzer to determine a relationship between the events that occurred during the session, execute the log analyzer to classify the usage log based on the relationship as either corresponding to human behavior or automated software robot behavior, and determine whether to exclude the usage log from generation of a metric in response to classifying the usage log.

In accordance with embodiments of the present disclosure, the log entries can correspond to investment events and payoff events, and the log entries can be analyzed to determine the relationship by determining an arrival rate of the payoff events. The usage log can be classified by determining whether the arrival rate of payoff events exceeds an arrival threshold and/or whether a time between payoff events is substantially identical.

In accordance with embodiments of the present disclosure, the log entries can be analyzed to determine the relationship by determining an intentionality associated with the events corresponding to the log entries. The intentionality of a usage log can be determined by determining, from the log entries, a quantity of search requests that were submitted during the session which did not result in a payoff event, determining a natural log of a quantity of search requests that were submitted during the session which did not result in a payoff event, and multiplying the natural log of the quantity of search requests by a multiplication factor. The multiplication factor can be formed by a constant value divided by an arrival rate of payoff events in the usage log. A product of the natural log of the quantity of search requests and the multiplication factor can be divided by a mathematical representation of an attention span of a human user to identify bulk content acquisitions.

In accordance with embodiments of the present disclosure, a work-level usage metric can be generated based on the payoff events included in the usage log after the usage log has been classified as being indicative of human behavior. Forecast data, trending data, recommendation data, and/or ranking data can be generated based on the work-level usage metric.

In accordance with embodiments of the present disclosure, an intentionality of a payoff event in a usage log can be determined according to at least one of the following mathematical expressions:

$$I(\pi_{s,t}) := \frac{20}{\lambda}\ln(V(\pi_{s,t})), \text{ or } I(\pi_{s,t}) := \frac{\frac{20}{\lambda}\ln(V(\pi_{s,t}))}{A(\pi_{s,t})}$$

where $\pi_{s,t}$ denotes a payoff event during a session s, at a time t; $I(\pi_{s,t})$ is an intentionality associated with the payoff event; $V(\pi_{s,t})$ denotes a level of effort based on a number of search requests submitted by a user without a payoff event following the search requests; $\lambda$ denotes the arrival rate of the payoff event; and $A(\pi_{s,t})$ denotes an attention span window.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present invention, and wherein:

FIG. 3 depicts a portion of an exemplary usage log in accordance with exemplary embodiments of the present disclosure.

DETAILED DESCRIPTION

Figure 1:
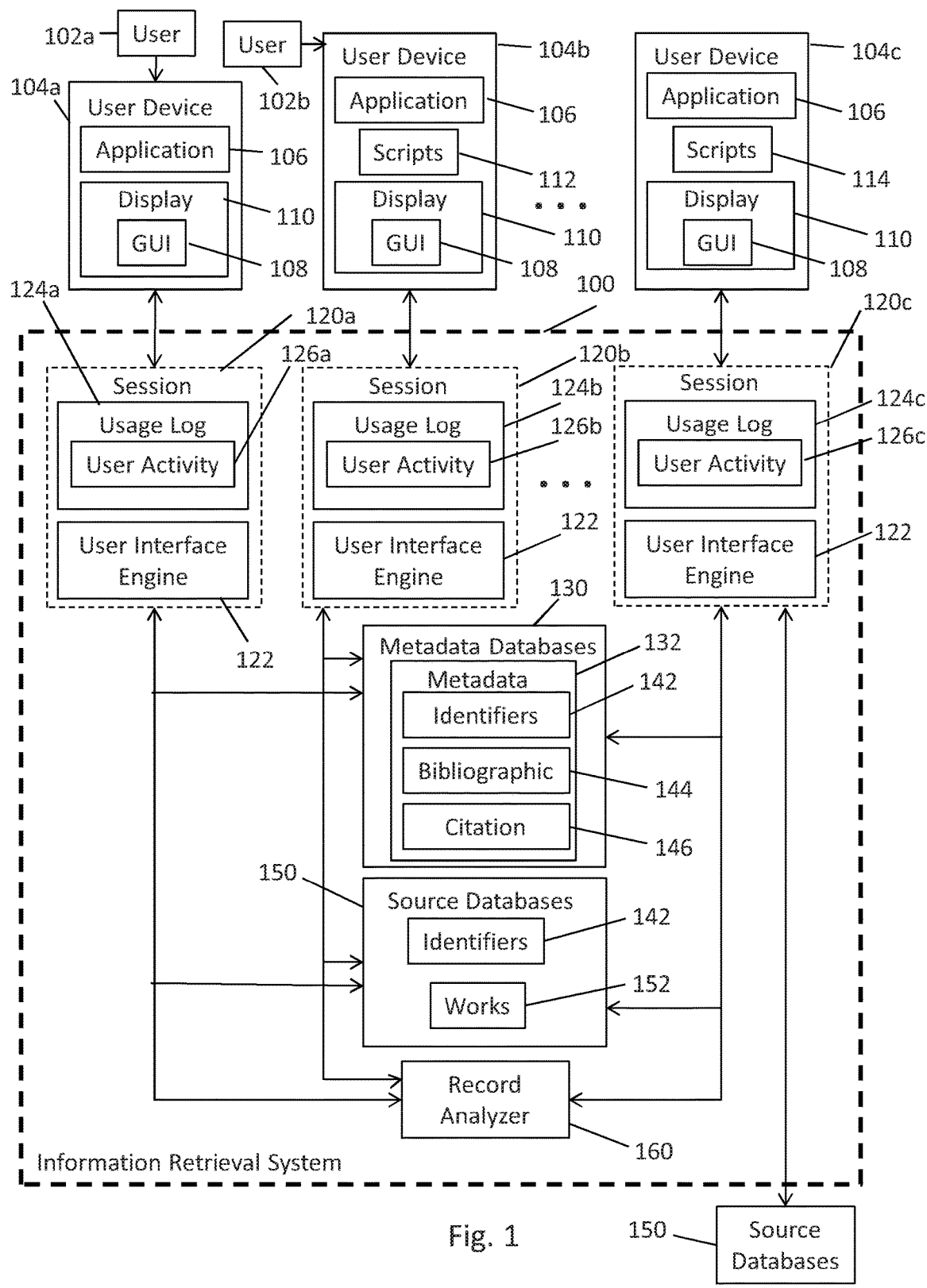
FIG. 1 is a block diagram depicting an information retrieval system in accordance with exemplary embodiments of the present disclosure.

Exemplary embodiments of the present disclosure are directed to utilizing usage logs from user sessions in information retrieval system to distinguish between sessions that include human intervention and those that include software robots with no human intervention. Exemplary embodiments of the present disclosure can observe, measure, and classify various user behaviors (including but not limited to search requests, refinements to search requests, metadata or document downloads, shares, prints, and the like) in order to qualify and/or quantify a degree of intentionality of a user (be they a human user or a "robotic" user). Based on the degree of intentionality in the usage logs, exemplary embodiments can cleanse the usage logs so that the subset of usage logs indicative of human behavior can be used to assign rankings, metrics, and other indicators to works identified in the usage logs to enable subsequent discovery of the works based on the rankings, metrics, and/or indicators.

Exemplary embodiments of the present disclosure are based on a theoretical model of intentional behavior under which it is assumed that when a user searches for content in one or more databases, skims content or metadata associated with the content, selects some of the content for a deeper review, and the like, the user is behaving intentionally. For example, in an information retrieval system that provides a reference management environment, when a user reads, downloads, shares, or prints works stored in one or more databases, the user is rewarded for the intentional behavior, e.g., because the user exerted some effort in searching for the works and ultimately found works considered to be valuable enough to the user that the user implemented one or more actions with respect to the works.

Exemplary embodiments advantageously provide the ability to accurately indicate the interest and importance of new research at an earlier stage by enabling the creation of a host of metrics, indicators, and trend analyses that can aid in increasing speed of work of researchers and research managers, enabling them to invest their time and resource more efficiently. These metrics, indicators, and trend analyses can complement and/or replace the more traditional citation counts metrics.

As one non-limiting example, exemplary embodiments can discriminate between usage logs in information retrieval system that provides a reference management environment, which includes a metadata database for written works, to exclude usage logs indicative of robot traffic from a set of usage logs that are used to create indicators of scientific interest expressed in usage logs, which can provide an early indication of the direction that scientific research is taking and will take in the future. The metrics and indicators can include a set of work-level (e.g., article-level) metrics and indicators based on usage logs processed according to exemplary embodiments of the present disclosure. These indicators can provide scientists/researchers with more efficient and accurate guides to emerging scientific discoveries, and can result in faster innovation and research discovery.

Several terms are defined herein to aid in the description of exemplary embodiments.

As used herein, a "work" is a data structure containing expressions in the form of binary and/or alphanumeric characters, audio, visual, and/or a combination thereof. For example, works can include computer or database files containing textual works, such as books, articles, poems, recipes, editorials, essays, patent, patent applications, datasheets, catalogues, treatises, legal opinions, case law, magazines or other periodicals, manuscripts, and papers presented, submitted and published by society, industry and professional organizations such as in proceedings and transactions publications, and the like; visual works, such as photographs, graphics, scanned documents, videos, and the like; audio works, such as spoken word, music, and the like.

As used herein, a "work-level usage indicator" or a "work-level usage metric" refers to an indicator or metric that is specific to a usage of a particular work or a usage of metadata associated with the particular work such that the indicator or metric can be used to characterize the usage of the particular work and/or the metadata associated with the particular work.

As used herein, "intentionality" refers to an estimation of a degree to which a user's behavior is indicative of someone processing search results and works with purpose and/or deliberation.

As used herein, a "payoff event" or "reward" refers to an act of a user to save, print, share, read, link to, or otherwise engage with content (e.g., a work) identified in search results by metadata.

As used herein, an "investment" or "investment event" refers to a quantifiable effort exerted by a user prior to a payoff event. For example, a user that submits a search request and then iteratively refines the search request to ultimate achieve a payoff event has made an investment in the payoff event.

FIG. 1 is a block diagram depicting an information retrieval system 100 in accordance with exemplary embodiments of the present disclosure. In exemplary embodiments, the information retrieval system 100 can be implemented by one or more servers and one or more databases, which can communicate directly with each other and/or may communicate with each other via one or more communication networks. Users devices 104a-c can interact with the information retrieval system 100 to establish communication sessions 120a-c, respectively. The user devices 104a-c can be computing devices (including a personal computer, a workstation, a tablet, a smart phone, a laptop, a server, and the like configured to communicate with the information retrieval system 100 over one or more communication networks using one or more communication protocol.

The sessions 120a-c persist for a period of time (e.g., from the time a user logs into the information retrieval system 100 to the time the user logs out of the information retrieval system 100 or until the session times out). and the sessions 120a-c can facilitate bidirectional communication between the information retrieval system 100 and the user devices 104a-c, and can maintain a state of the communication. For example, the information retrieval system 100 can save information about the session history and/or can instruct and/or control the user devices 104a-c to save information about the session history (e.g., in the form of tokens and/or cookies) to enable the communication. In some embodiments, the session history, or portions thereof, of the sessions 120a-c can be stored in usage/session logs 124a-c as described herein to capture user activities 126a-c. In exemplary embodiments, the sessions 120a-c can each be associated with a unique session identifier that can be used by the information retrieval system 100 to distinguish between the sessions 120a-c and identify the usage logs 124a-c corresponding to the sessions 120a-c, respectively.

The user devices 104a-c can each include an application 106, such as a web browser or a stand-alone application specific to the information retrieval system 100, which can be executed by the user devices 104a-c (e.g., by a processing device) to render one or more graphical user interfaces (GUIs) 108 on a display device 110 associated with each of the user devices 104a-c. The GUIs 108 displayed to users can include data entry areas to receive information from the user; user-selectable elements or areas that can be selected by the user to cause the information retrieval system 100 to perform one or more operations, functions, and/or processes; and/or can include data outputs to display information to users. In exemplary embodiments, the GUIs 108 can enable navigation and/or traversal of the information retrieval system 100.

As shown in FIG. 1, interactions between the user devices 104a-c and the information retrieval system 100 can have varying degrees of automation. As an example, a user 102a can interact with the user device 104a via the GUIs 108 to enter search requests to be submitted to the information retrieval system 100 and the user 102a can determine what actions are taken with respect to the results of the search requests.

As another example, user device 104b can be programmed with one or more software scripts 112 that can be executed by the user device 104b to at least partially automate an interaction with the information retrieval system 100 such that at least one or more search requests and/or one or more actions with respect to the results of the search requests are performed without intervening human interaction with the user device 104b. The scripts 112 may be used by the user 102b to facilitate interaction with the information retrieval system 100 so that the user 102b can efficiently, effectively, and iteratively search for and review (or perform other actions with) the results of a search request.

As another example, the user device 104c can be programmed with one or more software scripts 114, which can be executed by the user device 104c to automate an interaction with the information retrieval system 100 such that one or more search requests and one or more actions are taken with respect to the results of the search requests without intervening human interaction. The scripts 114 of user device 104c are typically configured to perform repetitive tasks, such as a large quantity of search requests or downloads, and to perform the same or similar action with respect to the results of the search requests (e.g., save the results). The scripts 114 implemented by the user device 104c are referred to herein as "software robots" or "software bots."

While most interactions can be of value when attempting to quantify and qualify metrics and/or altmetrics associated with works, it has been determined herein that interactions between user devices and the information retrieval system 100 using software robots where there is little or no human involvement are generally of little to no value in accurately quantifying or qualifying metrics and/or altmetrics. Interactions with the information retrieval system 100 resulting from software robots generally provided little to no value because the utilization of these software robots or bots can artificially increase a quantity of times content from the databases (e.g., works, written or otherwise) is downloaded, saved, shared, viewed, and/or printed, which may not reflect a value of the content to a human user since the human user was not involved in performing or requesting those actions. Thus, these software robots can negatively impact the ability of the information retrieval system 100 to determine and/or identify accurate metrics or altmetrics about the content of the databases.

The information retrieval system 100 can implement one or more instances of a user interface engine 122 for the sessions 120a-c (e.g., an instance for each of the sessions 120a-c), and the instances of the user interface engine 122 can be programmed to transmit instructions to the user devices 104a-c that can be used by the user devices 104a-c to render the GUIs 108 on the display devices 110. The users 102a-b and software scripts 112 and 114 can interact with the information retrieval system 100 using the GUIs 108 to perform one or more activities in information retrieval system 100. As one example, the user 102a, the user 102b, the scripts 112, and/or the scripts 114 can construct search requests consisting of one more search terms via the GUIs 108, and may submit the search requests to the information retrieval system 100, which can construct database queries including the search terms to search one or more of the databases for information corresponding to, or associated with, the search terms of the search requests. In some embodiments, users 102a-b and the scripts 112 and 114 can interact with the information retrieval system 100 without interacting with the GUIs 108. The one or more databases can return information in response to the database queries, and the information retrieval system 100 can provide the information to the requesting user device. During the session 120a-c, the users 102a-b, the scripts 112, and/or the scripts 114 can generate multiple search requests, e.g., to refine searches based on results from previous queries, search for different information, and/or can generate multiple search requests for any other reasons.

In exemplary embodiments, the one or more databases that can be searched in response to the search requests can include one or more metadata databases 130 and source databases 150. The source databases 150 can be configured to store source content or data and the metadata databases 130 can be configured to store metadata associated with the source content or data stored by the source databases 150. In exemplary embodiments, the source content or data can include any suitable content or data that may be stored in a database and retrieved in response to one or more database queries, and the metadata can generally be any metadata related to the source content or data. In some embodiments, the information retrieval system 100 can be configured to retrieve metadata from the metadata databases 130 in response to search requests received from the user devices 104a-c. The information retrieval system 100 can transmit the metadata to the user devices 104a-c to provide the user devices 104a-c with the results of the search requests. Based on the metadata returned in response to the search requests, the user devices 104a-c (in response to a human user or a software script) can request that the information retrieval system 100 retrieve the source content or data associated metadata.

In some embodiments, the information retrieval system 100 can provide a reference management environment in which the content of the databases 130 and 150 can include works (written or otherwise), as well as bibliographic information, citation information, and/or other metadata. In some embodiments, the databases 130 and 150 can include content that relates to legal, research, financial, scientific, medical health-care written works, as well as any other suitable content. As one non-limiting example, the databases 130 and 150 can include content associated with scientific articles that are published by one or more publishers. While some embodiments of the databases 130 and 150 may be described herein with respect to written works (e.g., books, articles, poems, recipes, editorials, essays, patent, patent applications, datasheets, catalogues, treatises, legal opinions, case law, magazines or other periodicals, manuscripts, and papers presented, submitted and published by society, industry and professional organizations such as in proceedings and transactions publications, and the like), those skilled in the art will recognize that exemplary embodiments are not limited to databases associated with written works. For example, in some embodiments of the present disclosure, the databases 130 and/or 150 can store information and content for audio works, visual works, audio-visual works, and/or any other suitable types of works. More generally, exemplary embodiments of the present disclosure can be implemented such that a metadata database that includes metadata associated with source content stored in a source database.

As described herein, the metadata databases 130 can include metadata 132 associated with source content, such as one or more works 152 stored in the source databases 150.

In some embodiments, the metadata databases 130 can be implemented as authority databases in which unique (alphanumeric) identifiers 142 (e.g. document identifiers) are assigned to data structures including source identifying information, such as citation information 144 and bibliographic information 146. The metadata databases 130 can be searched based on this source identifying information (e.g., the citation information 144 and/or bibliographic information 146) and/or the unique identifiers 142 associated with the data structures containing source identifying information (e.g., the citation information 144 and/or the bibliographic information 146. The unique identifiers 142, the citation information 144, and/or bibliographic information 146 can be utilized by the embodiments of the information retrieval system 100, which provide a reference management environment, to consistently, uniquely, and unambiguously return one or more of the unique identifiers 142, the citation information 144, and/or the bibliographic information 146 in response to search queries specified by the user.

In some embodiments, the citation information 144 and/or bibliographic information 146 can include one or more works that include citation relationships, abstracts, links to works, classification data, authorship, titles, publishers, publication year, and other metadata associated with works stored in the source databases 150. The metadata databases 130 can include cross references and/or logical linkages to other data structures including related works and/or similar works, e.g., based on authorship, titles, publishers, abstracts, publication year, and the like. Some examples of metadata databases 130 can include, for example, the Web of Science, Web of Knowledge, Cortellis, Biological Abstracts, and/or Thomson Reuters Innovation provided by Thomson Reuters, as well as, PubMed from the National Center for Biotechnology Information (NCBI), AMJUR, Crossref.org, JSTOR from ITHAKA, and/or BioOne.

In accordance with embodiments of the information retrieval system 100 that provide a reference management environment, the metadata databases 130 can be configured to include cross references and/or logical linkages to other data structures including trending works by field or topic, forecasted highly cited works by field or topic, recommended works by field or topic, and the like, e.g., based on authorship, titles, publishers, abstracts, publication year, a topic or field associated with the works, metrics and/or altmetrics generated by a usage log analyzer 160 according to embodiments of the present disclosure described herein, and/or based on any other suitable information. In some embodiments, the data structures that include trending works by field or topic, forecasted highly cited works by field or topic, and/or recommended works by field or topic can be stored in the metadata databases 130, the source databases 150, and/or in any other suitable databases that can be accessed and/or modified by the usage log analyzer 160.

As described herein, the source databases 150 can store source content, such as the one or more works 152, that can be retrieved in response to one or more operations of the information retrieval system 100 using for example, the unique identifiers 142 associated with the works 152. In exemplary embodiments, the source databases 150 can be included in the information retrieval system 100 and/or can be external to the information retrieval system 100. For embodiments of the information retrieval system 100 that provide a reference management environment, the works 152 can include, for example, written, audio, and/or audio-visual works related to one or more fields and/or topics. For example, in some embodiments, the works 152 stored in the source databases 150 can include written works related to legal, research, financial, scientific, medical, health-care topics or fields. Works 152 (e.g., records or documents) retrieved from the source databases 150 during any of the sessions 120*a-c* can be rendered on the display device 110 of the user devices 104*a-c* via an instance of the user interface engine 122; saved to a user-specific personal reference library corresponding to a user's account for future reference/use via an instance of the user interface engine 122; printed to a local or networked printer associated with the user devices 104*a-c* via an instance of the user interface engine 122; shared/sent via e-mail, text, or other mode of communication on behalf of the users 102*a-c* via an instance of the user interface engine 122; and/or the information retrieval system 100 can perform one or more further operations upon retrieval of one of the works 152 whether automatically or in response to input received from one or more of the users 102*a-b* via the GUIs 108.

The instances of the user interface engine 122 of the information retrieval system 100 can create and maintain the usage/session logs 124*a-c* for each session 120*a-c* established by each user device 104*a-c*, respectively, as records in a usage log database. The usage logs 124*a-c* are data structures specific to the sessions 120*a-c*, respectively, and capture interactions between the information retrieval system 100 and the user devices 104*a-c* (e.g., in response to inputs via the GUIs 108) as well as information about the interactions including a date and time of the interaction (e.g., a time stamp), an Internet Protocol (IP) address of the user devices 104*a-c*, a media access control (MAC) address, a username associated with the user account through which the sessions 120*a* were established. The interactions captured by the usage logs 124*a-c* can be session events that occurred during the sessions 120*a-c* corresponding usage logs 124*a-c*. For example, the usage logs 124*a-c* can include session events, such as search requests, selections of links in the search results to view source content, such as a work (e.g., a full text version of article) identified in search results, viewing of metadata, such as bibliographic information in the search results, downloading of a work identified in the search results, printing of a work identified in the search results, sharing (via e-mail) a work identified in the search results, and the like. The usage logs 124*a-c* can track (human or robot) user activities during the sessions 120*a-c* such that the information retrieval system 100 can create and maintain a usage log for each user device and/or user, for each session that is established by the user device and/or user.

In exemplary embodiments, the usage logs 124*a-c* can include a set of operations performed in the information retrieval system 100 that are associated with each other by a session identifier. The usage logs can include search requests submitted to the information retrieval system 100 by the user device 104*a-c*, actions performed by the information retrieval system 100 in response to queries and/or instructions received from the user devices 104*a-c*, and/or any other suitable information. For example, in addition to receiving search requests including search terms, the information retrieval system 100 can receive instructions to perform one or more actions with respect to a list of results returned by the databases 130 and 150 in response to database queries including the search terms. The actions that can be performed with respect to the results can include, but are not limited to, retrieving source content, such as one or more of the works (e.g., records or documents) included in the list of results, saving one or more of the works to a personal user library associated with an account of the user, making one or more of the works available for download by the user devices 104a-c, facilitate printing of one or more of the works, facilitate sharing of one or more of the works (e.g., by e-mail or other mode of communication), opening one or more of the works (e.g., instructing the GUIs 108 of the requesting user device to render one or more of the works), and/or can include any other suitable actions that can be performed with respect to the results.

The usage log analyzer 160 process a set of usage/session logs (e.g., the usage logs 124a-c) to cleanse automated robotic traffic from the set of usage logs at a session-level based on a relationship of events from sessions that are captured as log entries in the usage logs. The usage log analyzer 160 can generate one or more work-level usage metrics and/or altmetrics based on an investment-payoff model that measure intentionality to define the relationship between events. These metrics and/or altmetrics can be used by the log analyzer 160 that can be used to generate recommendations of source content, such as works, to a user based on search requests submitted by the user, works viewed by the user, works saved by the user, works printed by the user, works shared by the user (e.g., e-mailed to others); identify trending topics, fields, or works; rank works in a specified field or for a specified topic; and/or that can be used to forecast which works will likely be highly cited by other works.

In an exemplary operation of embodiments of the information retrieval system 100 configured to provide a reference management environment, upon receipt of a search request, the user interface engine 122 can construct one or more database queries that can be used to retrieve metadata and/or bibliographic data associated with one or more articles stored in a source database 150. The user interface engine 122 can also record an entry in the usage log for the current session providing the search request and search terms received by the environment 100 and can also record a date and time at which the search request was received. The database queries can be submitted to the metadata databases 130, and the databases 130 can return, as results to the search request, metadata and/or bibliographic data of articles corresponding to or associated with the search terms included in the search request. The results can be provided to the requesting user device and may be displayed on the display device 110 via the GUIs 108 as a list of the articles corresponding to or associated with the search terms included in the search request, where each article identified in the list is summarized using the metadata and bibliographic data returned by the databases 130.

One or more actions can be taken by the user device (either at the instruction of user or a software script) with respect to the articles included in the list. For example, if a human user is reviewing the search results, the user may select one of the articles included in the list to retrieve the full text version of the article (i.e. the actual article) from one of the source databases 150 and/or may generate another search request that includes refined search terms, which are informed by the previous results and/or any articles identified in the previous results that were retrieved from the source database 150. In response to an action that causes an article identified in the list to be retrieved from one of the source databases 150, the user interface engine 122 can add an entry to the usage log identifying the article that was retrieved as well as the data and time that the article was retrieved. In exemplary embodiments, the log entry can identify the article by a unique document identifier, such as a unique document identifier maintained in the metadata databases 130 for the article. Likewise, when another search request is submitted, the user interface engine 122 can add another entry to the usage log identifying the search request and search terms as well as the date and time that the search request was received. The user may continue to submit search requests and review the results until the session terminates, and the user interface engine can continue to update the usage log with log entries in response to the user's interaction with the information retrieval system 100.

While some embodiments of the information retrieval system 100 are described herein as providing a reference management environment including databases that store works (written or otherwise) and metadata associated with the works, exemplary embodiments of the present disclosure are not limited to such reference management environments. Rather, exemplary embodiments of the information retrieval system cover all alternatives, modifications, and equivalents as included within the spirit and scope of the present disclosure. Furthermore, while the log analyzer 160 has been illustrated as being a component of the information retrieval system 100, in exemplary embodiments of the present disclosure, the log analyzer can be a stand-alone component separate and distinct from the information retrieval system and/or can be incorporated into other systems and/or environments.

Figure 2:
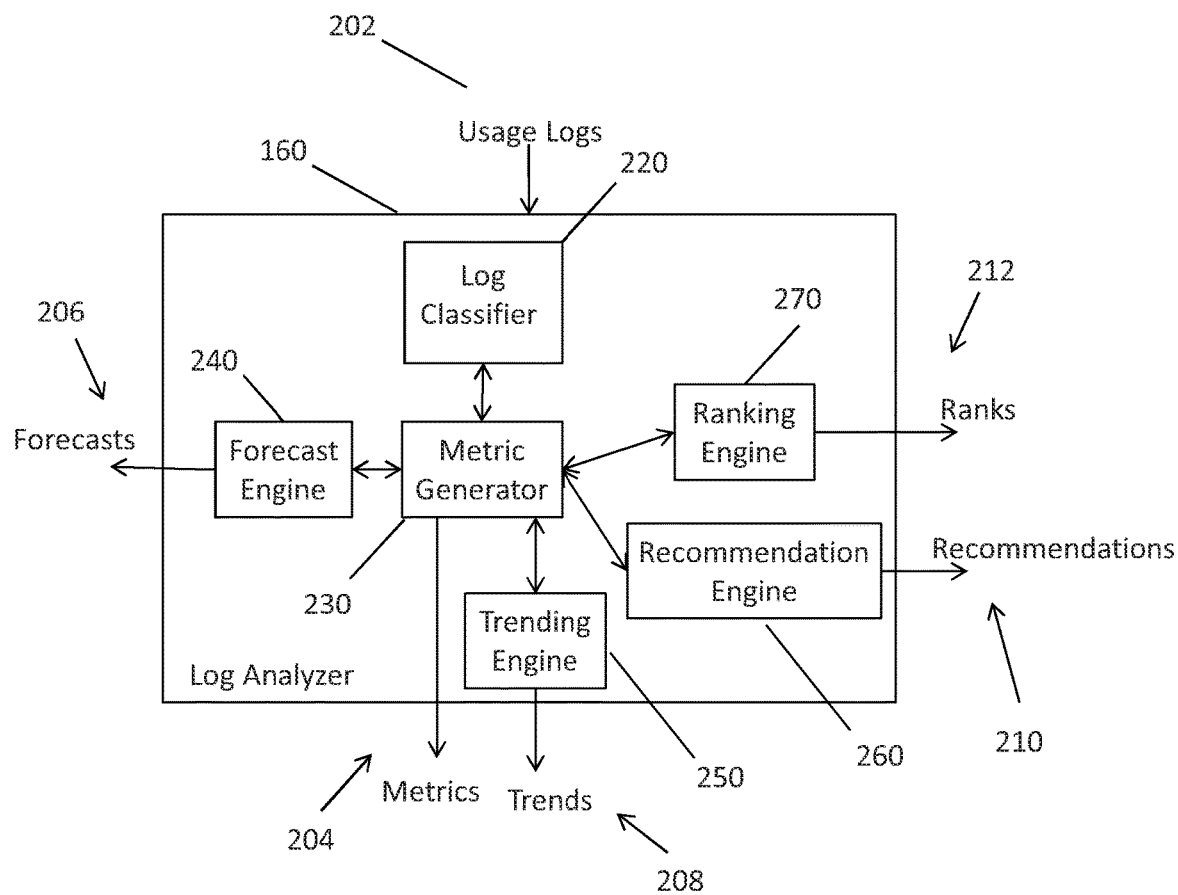
FIG. 2 is a block diagram of an exemplary embodiment of the log analyzer in accordance with the present disclosure.

FIG. 2 is a block diagram of an exemplary embodiment of the log analyzer 160 in accordance with the present disclosure. The log analyzer 160 can include a log classifier 220, a metric generator 230, a forecast engine 240, a trending engine 250, a recommendation engine 260, and a ranking engine 270. The log analyzer 160 can receive usage logs 202 as an input and outputs work-level usage metrics/altmetrics 204, forecasts 206, trends 208, recommendations 210, and ranks 212 based on the content of the usage logs 202. While exemplary embodiments of the log analyzer 160 are described as defining work-level usage metrics/altmetrics for works identified in the usage logs 202, exemplary embodiments of the log analyzer 160 described herein can generally generate content-level usage metrics/altmetrics for source content identified in usage logs or equivalents thereto.

The log classifier 220 can be programmed to evaluate the content of the usage/session logs 202 to classify the session from which the usage logs were generated as being based human behaviors or automated robot behavior. To classify a usage log, the log classifier 220 determines a relationship of events from a session that is captured as log entries in the usage log. The relationship can be based on the types of events that are captured, the quantity of events that are captured, a timing between events, and the like.

As one example, the log classifier 220 process each usage log 202 to classify the usage logs 202 based on a frequency of events identified in each usage log, a time between one or more types of events identified in each usage log, and/or a combination thereof, where the greater the frequency of events and the lesser the time between one or more types of events can be indicative of software robot behavior. Additionally, or in alternative, the log classifier can determine the extent to which the time between one or more types of events is regular (as opposed to generally random), which can also be indicative of software robot behavior. For example, usage logs for which a time between events is substantially identical can be classified as corresponding to automated software robot behavior. Threshold values for the frequency of events and/or the time between one or more types of events can be specified (e.g., based on historic data and/or training data) such that if the frequency of events and/or the time between one or more types of events exceed the threshold(s), the log classifier 220 can classify the events and/or usage log as corresponding to automated software robot behavior.

In some embodiments, the time between events can be characterized as an arrival time, and the log classifier 230 can classify a usage log based on whether the arrival time exceeds an arrival threshold (e.g., usage logs having arrival times that exceed the arrival threshold can be classified as corresponding to human behavior). As another example, exemplary embodiments can implement pattern recognition algorithms to detect patterns of events in usage logs that are indicative of human and/or automated software robot behaviors.

In exemplary embodiments, the log classifier 220 can distinguish between usage logs that are characteristic of human behavior and usage logs that are characteristic of software robot behavior by determining a level of intentionality in the usage logs 202, which refers to the degree to which the user (human or robot) is interacting with the information retrieval system with deliberation and purpose to identify and retrieve works. The greater the level of intentionality in a usage log, the more likely it is that the usage log is indicative of human behavior. The classification of the usage logs 202 based on the level of intentionality can be used by the log classifier 220 to identify subsets of the usage logs 202. A first subset of the usage logs can include usage logs that have been classified by the log classifier 220 as corresponding to sessions indicative to human behavior and a second subset of usage logs can include usage logs that have been classified by the log classifier 220 as corresponding to sessions indicative of software robot behavior. For example, a threshold value can be specified based on historic and/or training data, and the log classifier 220 can classify events and/or usage logs that exceed the threshold value as corresponding to human behavior. The log classifier can be configured to provide the first subset of usage logs that have been classified as corresponding to sessions indicative of human behavior to the metric generator 230, and can be configured to exclude the second subset of usage logs that have been classified as corresponding to sessions indicative of robot behavior from further processing by the log analyzer 160.

In exemplary embodiments, the log classifier 220 can determine a level of intentionality for a given usage log based on an investment-payoff model that quantifies investments and payoff events in the usage log. For example, the ratio of investments to payoff events can measure the intentionality of the usage log, where investments refer to activities in a session that are reflected in a usage log as log entries that indicate an effort to identify source content, such as works (e.g., articles) of interest, such as refining of search requests submitted to the information retrieval system 100 during the session, and payoff events refer to activities that indicate that a user has found something of interest based on the search requests, and can include requests to view source content, such as a work (e.g., article) identified in the search results, a request to print a work identified in the search results, a request to save or download a work identified in the search results, and/or a request to share a work identified in the search results via e-mail or any other suitable mode of communication. Generally, investment made by a user during a session is reflected in the usage log as the quantity of events and time that the user spends leading up to a payoff event.

In some embodiments, the log classifier 220 can determine a level of intentionality associated with a payoff event in a usage log by evaluating the following mathematically expression:

$$I(\pi_{s,t}) := \frac{20}{\lambda} \ln(V(\pi_{s,t})) \quad (1)$$

where $\pi_{s,t}$ denotes a payoff event during a session s, at a time t; $I(\pi_{s,t})$ is the intentionality associated with the payoff event $\pi_{s,t}$; $V(\pi_{s,t})$ denotes a level of effort based on the number of search requests submitted by a user which were not followed by a payoff event prior to a current result set (e.g., before another search request is submitted), reflecting search request refinements, which can be a proxy for the effort the user expended to achieve the payoff event $\pi_{s,t}$; and $\lambda$ denotes the arrival rate, i.e., the expected number of "events" or "arrivals" that occur per unit time fitted to window of time that elapses before the payoff event $\pi_{s,t}$ (e.g., using a Poisson arrival process given by $$Pr(|A| = n) = \frac{(\lambda \Delta)^n}{n!} \exp(-\lambda \Delta)).$$

The maximum likelihood estimate for the arrival rate $\lambda$ can be the average number of log entries for the session prior to the payoff event. The log of the level of effort $V(\pi_{s,t})$ is taken to reduce the effect of large sequences of search requests, which can have diminishing returns. The above equation assumes that a user spends at least five seconds to read search results, which is reflected by the inclusion of $$\frac{20}{\lambda}$$

in Equation 1, which provides a factor for rewarding events that are spaced in time at greater than five seconds and discounting events that occur to quickly. This value can be adjusted to change assumptions regarding the time spent by a user reading content.

Equation 1 can be refined to differentiate between a user focusing on a specific piece of research rather than bulk content acquisition. For example, if there are few other intentional acts in a window around the payoff event $\pi_{s,t}$, then it can be determined that the content acquisition was not committed in bulk. To quantify the intentionality of the payoff event $\pi_{s,t}$ in consideration of bulk content acquisition, the log classifier 220 can evaluate the following mathematical expression:

$$I(\pi_{s,t}) := \frac{\frac{20}{\lambda} \ln(V(\pi_{s,t}))}{A(\pi_{s,t})} \quad (2)$$

where $A(\pi_{s,t})$ denotes an attention span window or an activity window and is determined by the log classifier 220 by evaluating the following mathematical expression:

$$A(\pi_{s,t}) := \sum_{\delta \in A} \frac{1}{2\delta} (|\{\pi'_{s,t} : t' \in [t-\delta, t+\delta]\}|); \quad (3)$$

$$\delta \in A = \{1, 5, 10, 60, 120\} \quad (4)$$

The variable $\delta$ denotes an attention span of a human user in minutes. When $A(\pi_{s,t})$ is high then the payoff event $\pi_{s,t}$ was likely committed in a bulk context; thereby reducing the intentionality of the payoff event $\pi_{s,t}$. When $A(\pi_{s,t})$ is low it likely that the payoff event was not committed in a bulk context; thereby increasing the intentionality of the payoff event $\pi_{s,t}$. The terms of Equation 2 can be calibrated from historic data to ensure an appropriate weighting or emphasis is placed on investment, payoff, and bulk events.

The metric generator 230 can receive the subset of usage logs, which has been cleansed of usage logs corresponding to automated robotic behavior based on the classification by the log classifier 220. The subset of usage logs identified by the log classifier 220 includes usage logs that are indicative of human behavior. The metric generator 230 can generate one or more work-level (e.g., article-level) metrics and/or altmetrics (e.g., metrics and/or altmetrics associated with a specific article) based on the content of the subset of usage logs 202, which can be output from the metric generator as metrics 204. As described herein, the usage logs can include events associated with the retrieval and/or use a work identified in search results, and the log entries associated with these events can include a unique identifier associated with the work that can be used by the metric generator 230 to generate work-level metrics.

The metric generator 230 can generate and output a work-level usage indicator, based on the content of the subset of the usage logs 202, that provides a running total of times a work was retrieved from a source database in a specified period of time, where the retrieval of the work can be performed to allow a user to act to view the work, print the work, download the work, link to the work (e.g., to cite the work in the user's own work), and/or share the work (e.g., via e-mail or other suitable modes of communication). In some embodiments, the acts performed by or on-behalf of the user in the usage logs can be weight such that some acts are more valuable than other act. As one non-limiting example, greater weight can be given to the act of viewing the work and linking to the work and less weight can be given to printing and sharing the work. Another work-level usage indicator that can be generated by the metric generator 230 can include a ratio of the number of times a work is shared to a number of times the work is viewed within a specified time period. Another work-level usage indicator that can be generated by the metric generator 230 is a most viewed works metric, for example, with a specific subject category, in a specified period of time to identify the most interesting articles in a publisher-neutral fashion. Another work-level metric that can be generated by the metric generator 230 can include a most frequently viewed works metric for one or more fields or topic, e.g., by determining usage patterns of a work during a defined period of time whose usage exceeds those of its peers.

The forecast engine 240 can receive one or more of the work-level metrics 204 generated by the metrics generator 230 for usage logs over a specified time period and generate one or more forecasts 206 that can be output by the log analyzer 160. As one non-limiting example, the forecast engine 240 can receive a citation history of works (e.g., a number of times that the work was link to by other works) over a specified period of time. The forecast engine 240 can determine a trajectory of the citations of the works, e.g., based on a slope of the citation history over the specified time period, where the slope can be indicative of a rate at which the works are being cited. The forecast engine 240 can use the slope to extrapolate forecasted number of citations that the works are likely to receive at a future time. The forecast engine 240 can then receive a work-level usage indicator corresponding to a quantity of times a work was retrieved from a source database over a specified period of time (e.g., a retrieval history). The forecast engine 240 can determine a trajectory of the retrieval history, e.g., based on a slope of the over the specified time period, where the slope can be indicative of a rate at which the work is being retrieved. The forecast engine 240 can use the slope to extrapolate forecasted number of retrieval that the work is likely to receive. The retrieval and citation histories can then be correlated to forecast the number of citations the work is likely to receive, based on the number of retrievals.

The trending engine 250 can receive one or more of the work-level metrics 204 generated by the metrics generator 230 for usage logs over a specified time period and generate one or more trends 208 that can be output by the log analyzer 160. As one non-limiting example, the trending engine 250 can receive a work-level usage indicator corresponding to a retrieval history of works (e.g., a number of times that the work was retrieved from a source database) over a specified period of time, and can compare the retrieval history of the works to the retrieval history of other works that are in the same or a similar field. Based on the comparison, the trending engine 250 can determine which of the works have been retrieved more often than their peers and can generate a trending works list, which can be rendered via one or more GUIs displayed by the display device of the user devices.

The recommendation engine 260 can receive one or more of the work-level metrics 204 generated by the metrics generator 230 and generate one or more recommendations 210 that can be output by the log analyzer 160. As one non-limiting example, the recommendation engine 260 can receive a work-level usage indicator corresponding to a retrieval history of works (e.g., a number of times that the work was retrieved from a source database) over a specified period of time, and can correlate the retrieval history of the works with the search terms used to return the search results that identified the works as well as the metadata associated with the works (e.g., bibliographic and citation information) to generate links and/or cross-references in the metadata database and/or the source database between works based on the correlation. When a user establishes a session and submits a search request, the instance of the user interface engine associated with the session can identify recommended works based on the search terms and the results returned in response to the search request. As another example, when a user initiates an action to retrieve a work identified in search results, the user interface engine can construct a database query to identify recommend works based on links or cross references in the metadata database between the retrieved work and recommended works.

The ranking engine 270 can receive one or more of the work-level metrics 204 generated by the metrics generator 230 and generate one or more rankings 212 that can be output by the log analyzer 160. As one non-limiting example, the ranking engine 270 can receive a work-level usage indicator corresponding to a retrieval history of works (e.g., a number of times that the work was retrieved from a source database) over a specified period of time, and can compare the retrieval history of the works to the retrieval history of other works that are in the same or a similar field. Based on the comparison, the ranking engine 250 can rank the works against their peers to assign the works a relative ranking within a specified field or topic.

As another non-limiting example, exemplary embodiments of the present disclosure can use the level of intentionality (as defined by Equation 2 above) associated with works corresponding to payoff events identified in the usage logs as a proxy for importance or attention that the works are receiving and can generate ranks based on the intentionality. That is, the intentionality associated with such works can be used to assign scores to the works associated with payoff events in the usage logs. For example, the score for a work can be determined by evaluating the following mathematical expression:

$$\text{Score}(\text{work}) = f(I(\pi_{s,t})) \qquad (5)$$

where f is an aggregating function, such as a count function or log(1+count) function. Based on the scores assigned to the works, exemplary embodiments can determine a ranking of the works based on an evaluation of the following mathematically expression:

$$\text{Rank}(\text{work}) = \frac{\text{score}(\text{work})}{\text{sum}(\text{score}(\text{work}'))} \qquad (6)$$

where sum(score(work')) is the sum of the scores for all works over a specified time period or for all works of a specified field or topic over a specified time period. That is, the rank associated with a work corresponds to what proportion of all of the payoff events the work received in the last minute, hour, day, week, month, year, and the like, when all works are considered or when all works corresponding to a field or topic associated with the work are considered. In some embodiments, the ranks can be used to highlight works that show significant jumps in rank in a specified time period.

FIG. 3 depicts a portion of an exemplary usage log 300 in accordance with exemplary embodiments of the present disclosure. As shown in FIG. 3, the usage log 300 can include log entries representing session events that occurred during a session corresponding to the usage log 300. The usage log can include times 302 at which the session events occurred during the session, actions 304 performed by the information retrieval system, and targets 306 associated with the actions 304. The actions 304 can identify data structures, such as objects, classes, functions, and the like that can be implemented in the information retrieval system to perform one or more of the actions 304, and the targets 306 can include data that can be used by the data structures facilitate performance of the one or more actions.

As one example, sessions events can include search requests (and refinements) submitted to an exemplary embodiment of the information retrieval system, which are represented by log entries 310, views of metadata and/or bibliographic information of a work (e.g., journal article), which are represented by log entries 320, and retrieval of full text versions of a work for viewing, printing, sharing, downloading, and the like, which are represented by log entries 330. The targets for the search requests (and refinements) can include search terms 312 that can be included in a database query constructed by the information retrieval system to retrieve metadata and/or bibliographic information from the metadata database and/or the authority database. The targets for the log entries 320 and 330 can include unique document identifiers 322 that corresponds to a selection a work identified in the search results, and can be used by the information retrieval system to construct a database query that uses the unique identifier to retrieve the work from source database.

Figure 4:
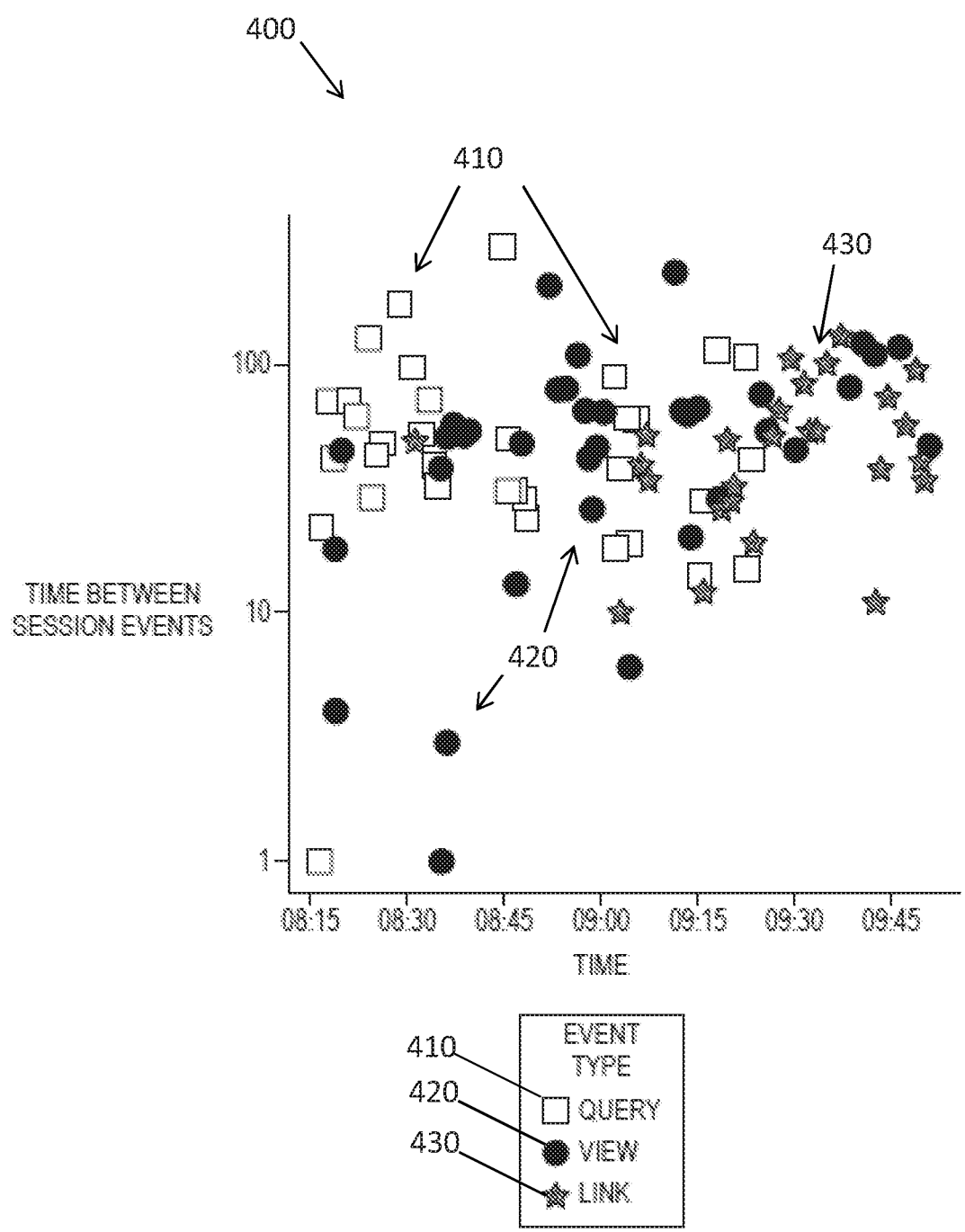
FIG. 4 is a graph illustrating a sequence of events in an example usage log that is indicative of human behavior in an exemplary embodiment of the information retrieval system that provides a reference management environment for scientific articles.
Figure 6:
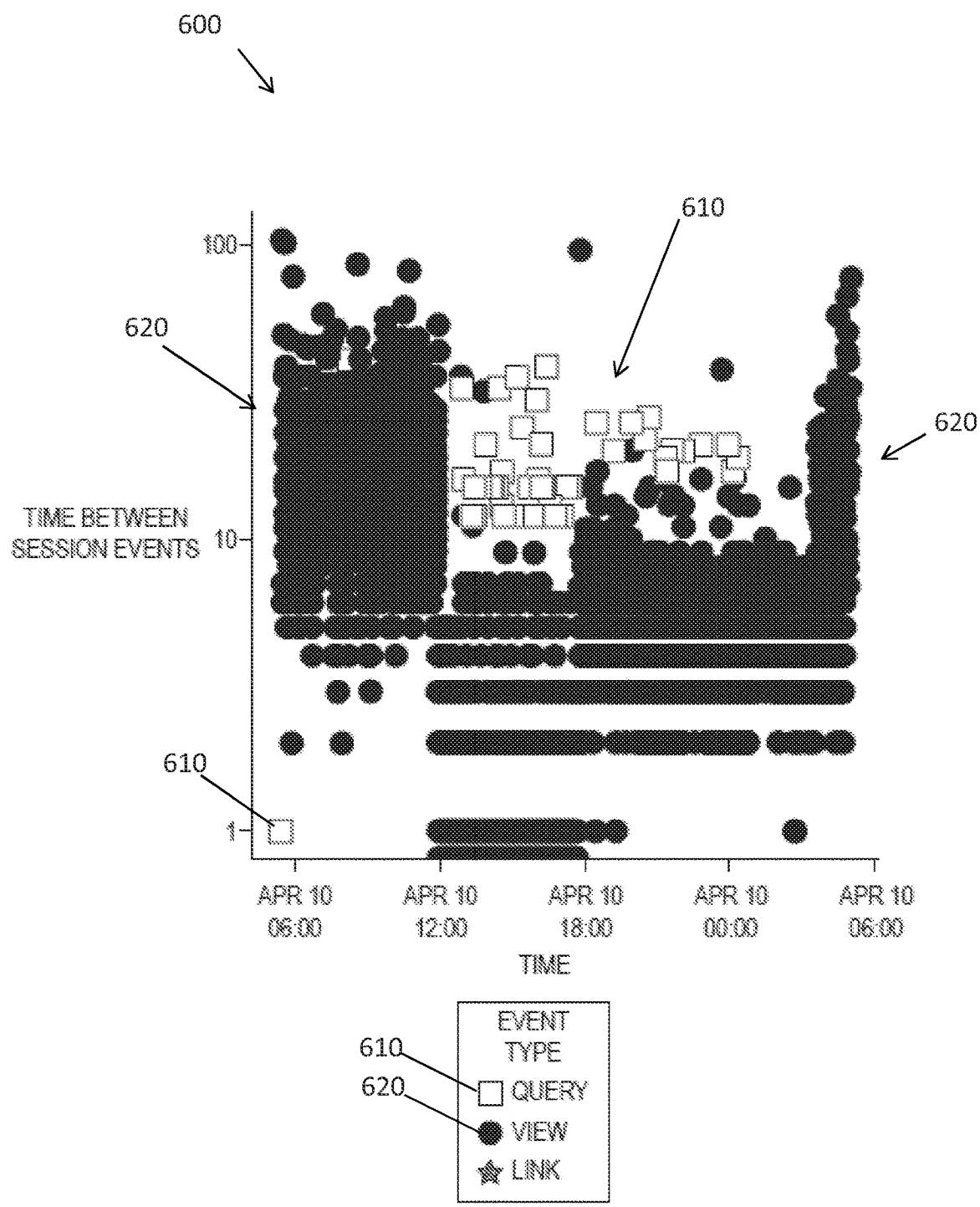
FIG. 6 is a graph illustrating a sequence of events in a usage log that is indicative of automated software robot behavior in an exemplary embodiment of the information retrieval system that provides a reference management environment for scientific articles.

FIG. 4 is a graph 400 illustrating a sequence of events in an example usage log that is indicative of human behavior in an exemplary embodiment of the information retrieval system that provides a reference management environment for scientific articles. The graph 400 includes an x-axis, which represents time, and a y-axis that represents a time between session events. As shown in FIG. 6, user starts a session at about time 8:15 and submits a series of search requests 410 over about a forty-five minute period, while periodically viewing metadata and/or bibliographic information (denoted by 420) associated with scientific articles returned by the search requests 410. Between times 9:00 and 9:45, the number of search requests decrease and the user begins selecting links in the results to retrieve full text versions of the articles (denoted by 430). This pattern of behavior is indicative of a human user that is generating search requests 410; refining the search requests 410 based on information obtained by viewing the metadata and/or bibliographic information of articles identified in search results returned by the information retrieval system; and subsequently collecting the identified articles. Using the above approach, the pattern of events in the usage log shown in the graph 400 can be considered when classifying usage logs as either being associated with human behavior or software robot behavior.

Figure 5:
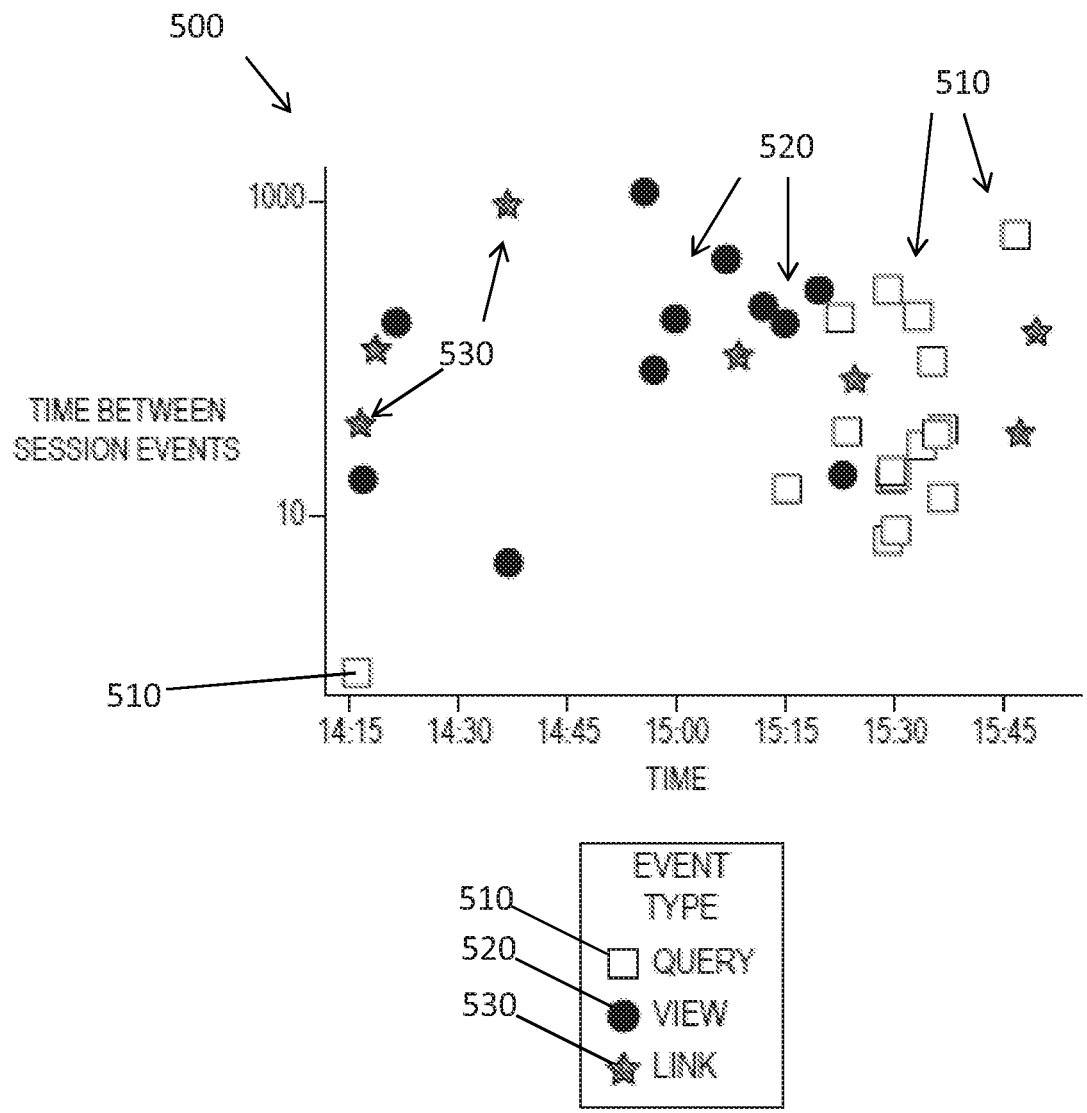
FIG. 5 is a graph illustrating a sequence of events in another example usage log that is indicative of human behavior in an exemplary embodiment of the information retrieval system that provides a reference management environment for scientific articles.

FIG. 5 is a graph 500 illustrating a sequence of events in another example usage log that is indicative of human behavior in an exemplary embodiment of the information retrieval system that provides a reference management environment for scientific articles. The graph 500 includes an x-axis, which represents time, and a y-axis that represents a time between session events. As shown in FIG. 5, user starts a session at about 14:15 and submits a search request 510, after which the user views metadata and/or bibliographic information (denoted by 520) associated with scientific articles returned by the search requests 510 and selects links in the search results to retrieve full text versions of articles in the search results (denoted by 530). The user continues viewing and selecting links in the search results for about one hour, and then begins to submit additional search requests 510. This pattern of behavior is indicative of a human user that spends a considerable amount of time reviewing results from a search request before generating additional search requests, which may indicate that the user is refining the search requests. Using the above approach, the pattern of events in the usage log shown in the graph 500 can be considered when classifying usage logs as either being associated with human behavior or software robot behavior.

FIG. 6 is a graph 600 illustrating a sequence of events in a usage log that is indicative of automated software robot behavior in an exemplary embodiment of the information retrieval system that provides a reference management environment for scientific articles. The graph 600 includes an x-axis, which represents time, and a y-axis that represents a time between session events. As shown in FIG. 6, the user starts a session by submitting search requests 610 and then viewing large amounts of metadata and/or bibliographic information (denoted by 620) returned in response to the search request in a generally short time period and with a generally short time period between session events. Also, the session events occurred a generally regular time increment. This pattern of behavior is indicative of an automated software robot user that spends a considerable amount of time gather large amounts of data at a relatively fast pace, which may indicate that the automated software robot user is cataloging articles associated with specific search requests. Using the above approach, the pattern of events in the usage log shown in the graph 600 can be considered when classifying usage logs as either being associated with human behavior or software robot behavior.

Figure 7:
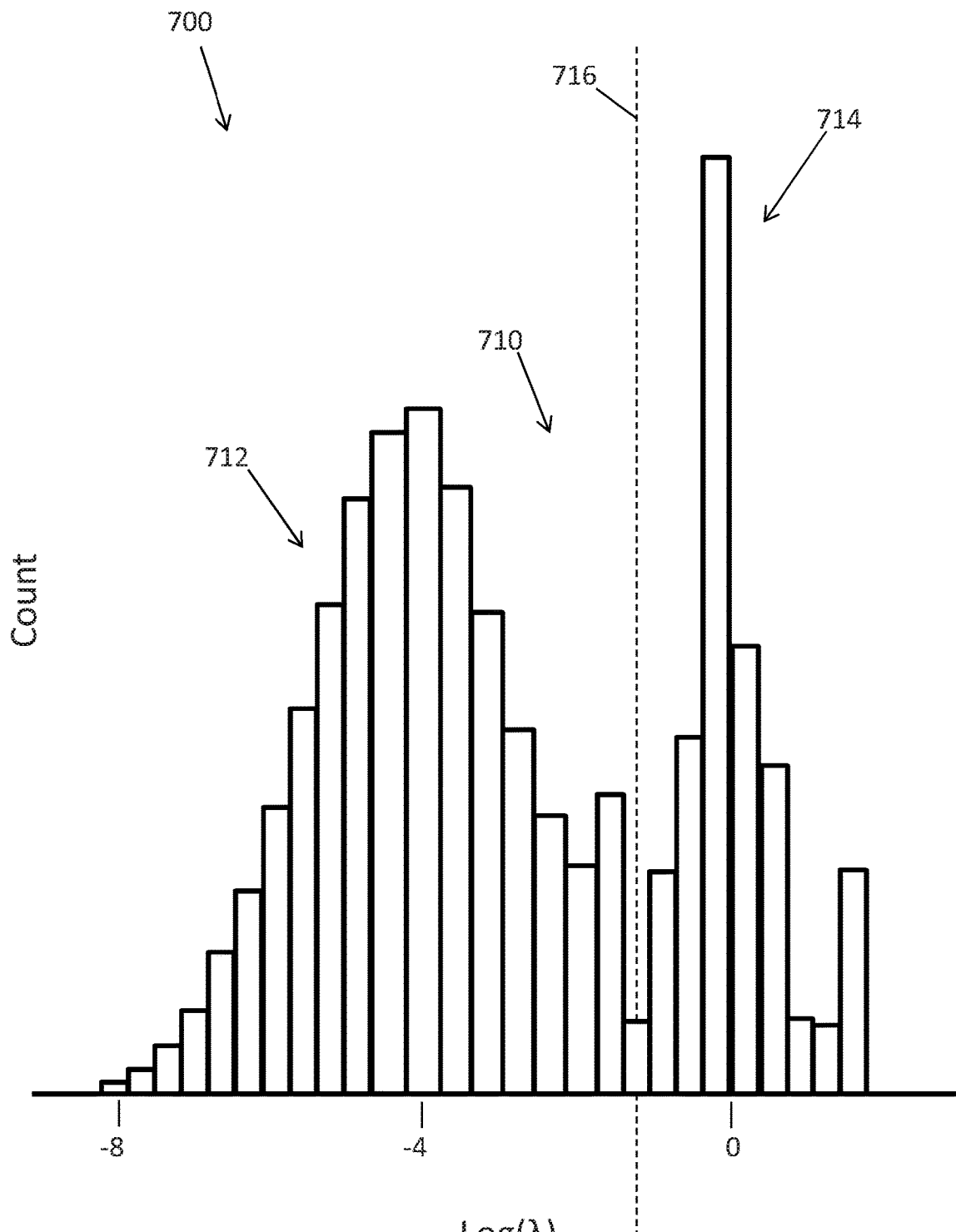
FIG. 7 is a logarithmic graph illustrating experimental data having bimodal distribution of payoff events per unit of time to show a demarcation between payoff events associated with human behavior and payoff events associated with automated software robot behavior.

FIG. 7 is a logarithmic graph 700 illustrating experimental data showing payoff events per unit of time. The graph 700 includes a y-axis that corresponds to a quantity of payoff events and an x-axis that corresponds to the natural log of the arrival rate of events according to time, where −4 on the x-axis corresponds to about 1.1 payoff events per minute and 0 on the x-axis corresponds to about 1 payoff event per second. As shown in FIG. 7, the graph 700 includes a bimodal distribution 710 that includes a distribution 712 centered about −4 on the x-axis and a distribution 714 centered about 0 on the x-axis.

A line 716 is included on the graph 700 to illustrate an area between the two distributions 712 and 714 that can be used to demarcate the distributions 712 and 714, where the distribution 712 corresponds to a rate of payoff events that is indicative of human behavior and the distribution 714 corresponds to a rate of payoff events that is indicative of an automated software robot behavior. Graphically, the location of the line 716 along the x-axis can be adjusted to include and/or exclude rates of payoff events that approach one payoff event per second. For example, if the location of the line 716 is moved towards X=0, exemplary embodiments can be configured to include more usage logs, which can be generated in response to an interaction of automated software robots with the information retrieval system, and if the location of the line 716 is moved away from X=0, exemplary embodiments can be configured to exclude more usage logs that may correspond to human behavior. Thus, usage logs located to the left of the line 716 can be classified as usage logs indicative of human behavior and usage logs located to the right of the line 716 can be classified as usage logs indicative of automated software robot behavior.

Figure 8:
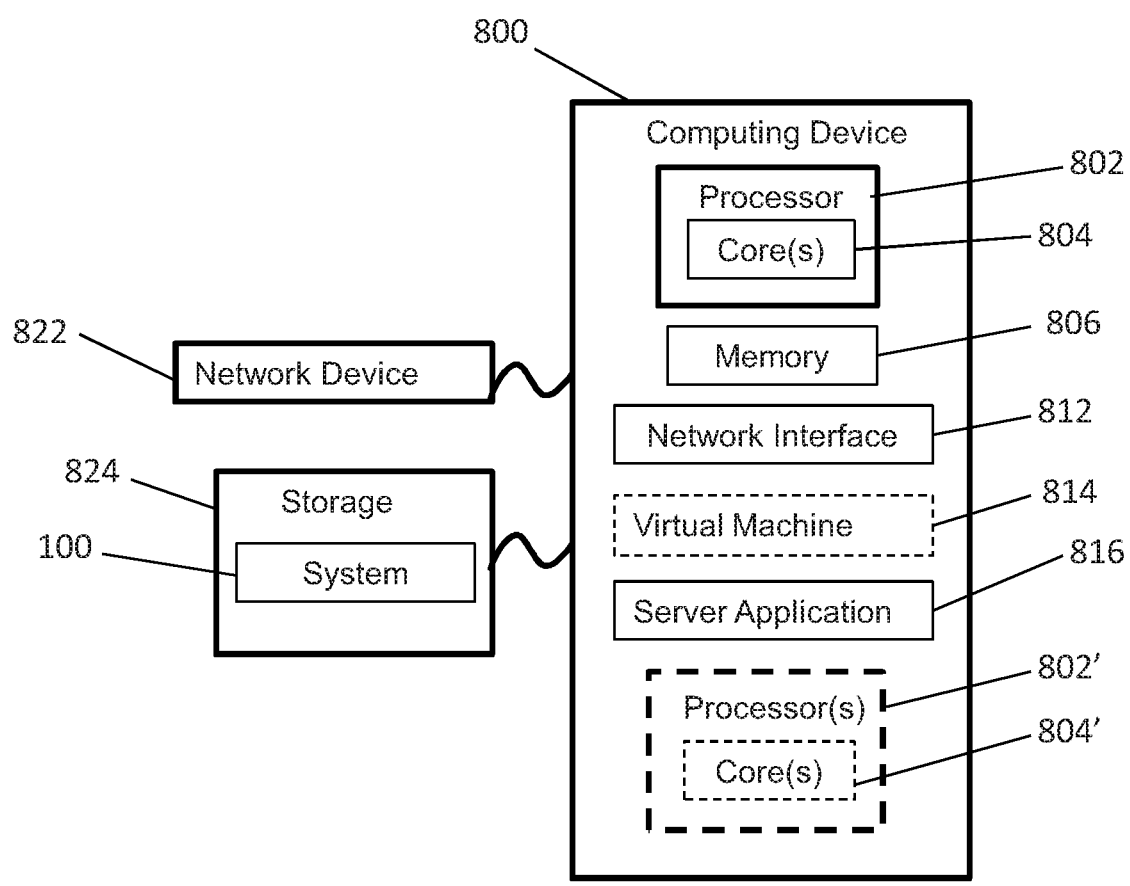
FIG. 8 depicts an exemplary server for implementing embodiments of the information retrieval system in accordance with exemplary embodiments of the present disclosure.

FIG. 8 depicts a block diagram of an exemplary computing device 800 that can be utilized to implement embodiments of the information retrieval system 100 or portions thereof. In the present embodiment, the computing device 800 is configured as a server that is programmed and/or configured to execute one of more of the operations and/or functions of the information retrieval system 100 and to facilitate communication with a user devices, such as embodiments of the user devices 104a-c. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the environment 100 or portions thereof. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

The computing device 800 may also include one or more storage devices 824, such as a hard-drive, CD-ROM, mass storage flash drive, or other computer readable media, for storing data and computer-readable instructions and/or software that can be executed by the processing device 802 to implement exemplary embodiments of the environment 100 described herein.

The computing device 800 can include a network interface 812 configured to interface via one or more network devices 822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. While the computing device 800 depicted in FIG. 8 is implemented as a server, exemplary embodiments of the computing device 800 can be any computer system, such as a workstation, desktop computer or other form of computing or telecommunications device that is capable of communication with other devices either by wireless communication or wired communication and that has sufficient processor power and memory capacity to perform the operations described herein.

The computing device 800 may run any server application 816, such as any of the versions of server applications including any Unix-based server applications, Linux-based server application, any proprietary server applications, or any other server applications capable of running on the computing device 800 and performing the operations described herein. An example of a server application that can run on the computing device includes the Apache server application.

Figure 9:
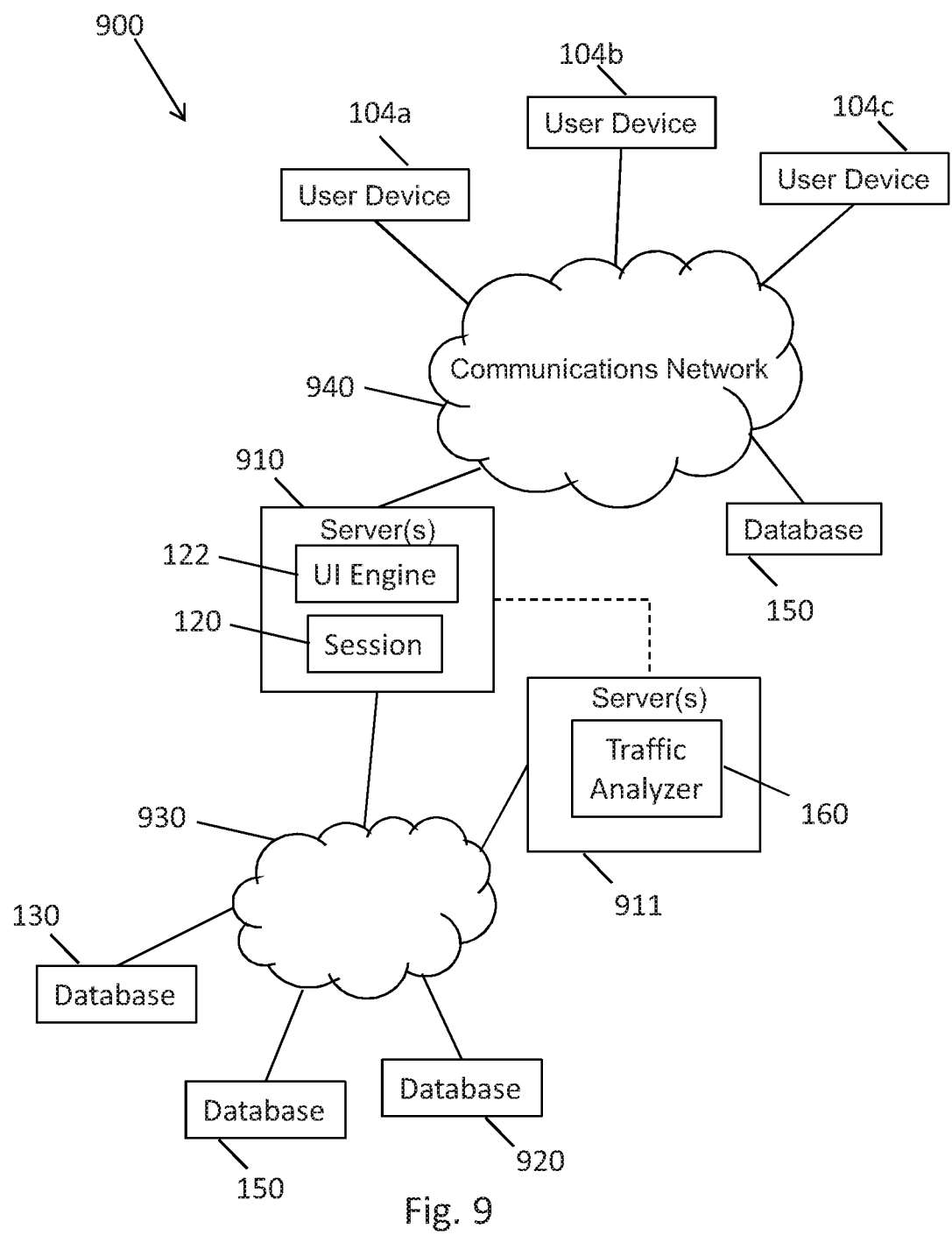
FIG. 9 depicts an exemplary distributed server environment for implementing embodiments of the information retrieval system in accordance with embodiments of the present disclosure.

FIG. 9 depicts an exemplary distributed server environment 900 for implementing embodiments of the information retrieval system 100 in accordance with embodiments of the present disclosure. As shown in FIG. 9, the environment 100 can be implemented using servers 910-911, metadata database 130, source database 150, and usage log database 920, which can be operatively coupled to each other through a communication network 930. The communication network can be implemented as an Intranet, virtual private network (VPN), wide area network (WAN), local area network (LAN), and/or other suitable communication network.

The server 910 can be programmed to execute instances of the user interface engine 122 to support session 120 and facilitate interaction between user device 104a-c and the information retrieval system 100. The user devices 104a-c can be operatively coupled to the sever 910 via a communication network 940, which can be the Internet, a wide area network (WAN), local area network (LAN), and/or other suitable communication network. The user devices 104*a-c* can initiate communication with the server 910 to establish the sessions 120 and can submit one or more search requests to the server 910. Upon receipt of a search request, the server 910 can construct one or more database queries using search terms included in the search request and can query the metadata database 130. The metadata database 130 can return metadata associated with works stored in the source databases 150, and the server 910 can execute an instance of the user interface engine 122 to provide instructions and the search results to the requesting user device (e.g., user device 104*a*). The instructions can be used by the user device 104*a* to render the search results via one or more GUIs 108.

In exemplary embodiments, the search results can identify one or more works that can be retrieved from the source databases 150 by their unique identifiers, title, publisher, author(s), and/or any other metadata that can be associated with the works. In addition, the search results can include one or links associated with the works, which can be selected on the user device 104*a* to facilitate one or more actions with respect to the works corresponding to the links. For example, a user can interact with the results to select a link to retrieve a work corresponding to the selected link, and the user device 104*a* can transmit a retrieval request to the server 910, which can process the request to construct a query including for example, a unique identifier corresponding to the work, which can be used to retrieve the work from the source database 150 within the information retrieval system 100 or the source database 150 disposed external to the information retrieval system 100 (e.g., operatively coupled to the communications network 940). Upon retrieval of the work, the server 910, can transmit the work to the user device to allow the user to view the work.

While the user devices and the server 910 are interacting the instances of the user interface engines 122 are creating and maintaining usage logs for each active session and are storing the usage logs in the database 920 for future use. For example, each time the user devices submit a search request or a refined search request, the user interface engine 122 can be executed by the server 910 to add an entry to the usage logs, and each time the server 910 a user device requests the server to take one or more actions with respect to works stored in the source databases 150 (e.g., requests to retrieve the works), the server can execute the user interface engine 122 to add an entry to the usage log.

The server 911 can be configured to execute the record analyzer 160 to analyze the usage logs stored in the database 920. For example, the record analyzer 160 can retrieve one or more usage/session logs from the database 920, and can classify the usage logs as being associated with human behavior or automated software robot behavior based on the log entries included in the usage log. After classifying the usage logs, the record analyzer can generate one or more work-level usage metrics, forecasts, trends, recommendation, and/or rankings, which can be selective transmitted to the server 910 and output to the user devices 104*a-c* by the server 910 in response to interactions between the user devices 104*a-c* and the server 911. In some embodiments, the record analyzer can generate one or more reports that include the one or more work-level usage metrics, forecasts, trends, recommendation, and/or rankings, which may be used by publishers, funders, researchers, and the like to determine a value of a body of works or specific fields or topics.

Figure 10:
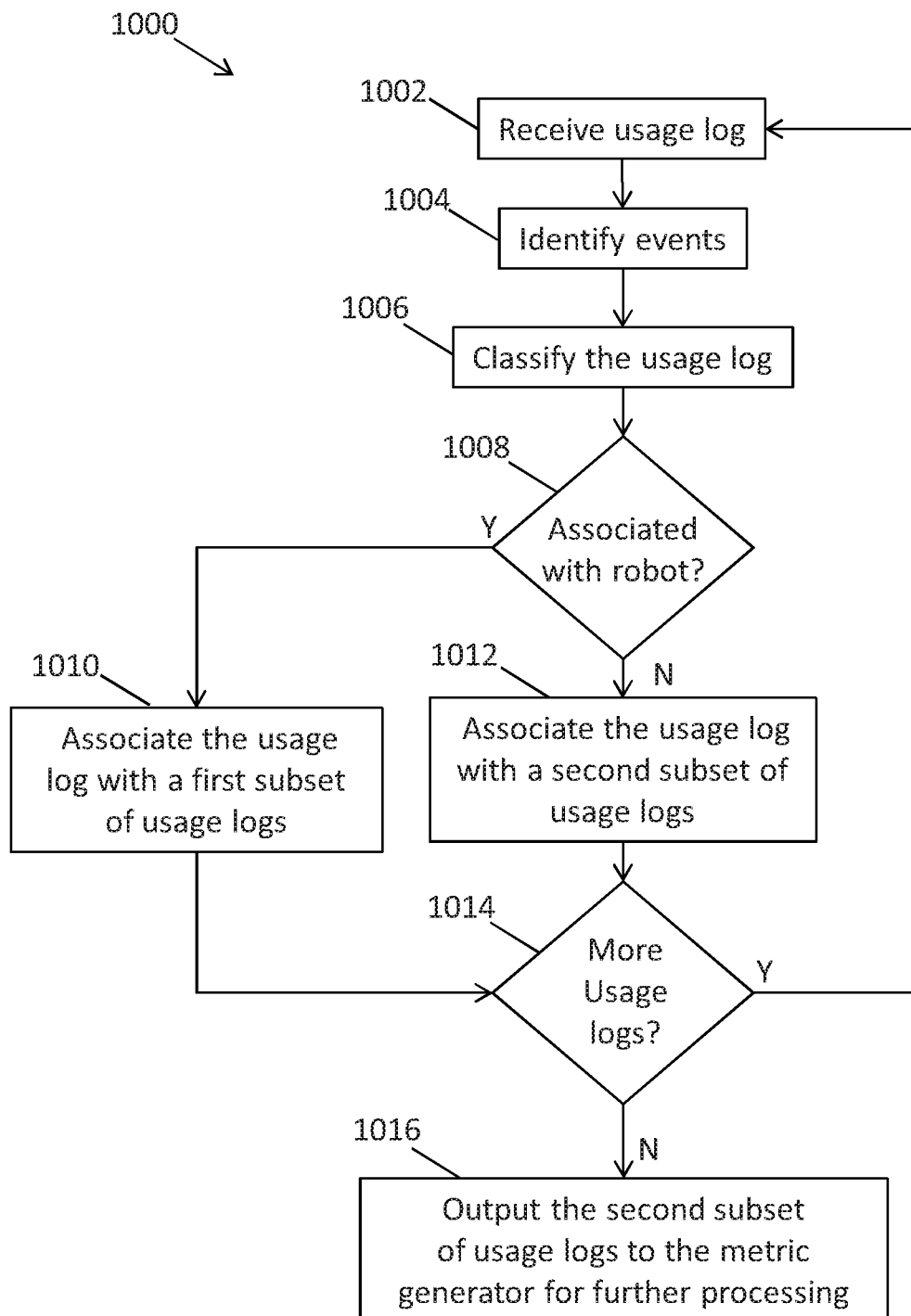
FIG. 10 is a flowchart illustrating an exemplary process for distinguishing between usage logs indicative of human behavior and usage logs indicative of automated software robot behavior in an information retrieval system.

FIG. 10 is a flowchart illustrating an exemplary process 1000 for distinguishing between usage logs indicative of human behavior and usage logs indicative of automated software robot behavior in an information retrieval system. At step 1002, a usage log is received by the log classifier. At step 1004, the log classifier analyzes log entries in the usage log to identify events that occurred during the session associated with the usage log. At step 1006, the log classifier classifies the usage log as being associated with a human or an automated software robot. If the usage log is associated with an automated software robot (step 1008), the log classifier associates the usage log with a first subset of usage logs at step 1010. Otherwise, the log classifier associates the usage log with a second subset of usage logs at step 1012. Regardless of whether the usage log is associated with the first or second subset of usage logs, the process 1000 continues at step 1014, to determine whether there are more usage logs to classify. If so, the process repeats from step 1002. If not, at step 1016, the second subset of usage logs is output to the metric generator for further processing as described herein.

Figure 11:
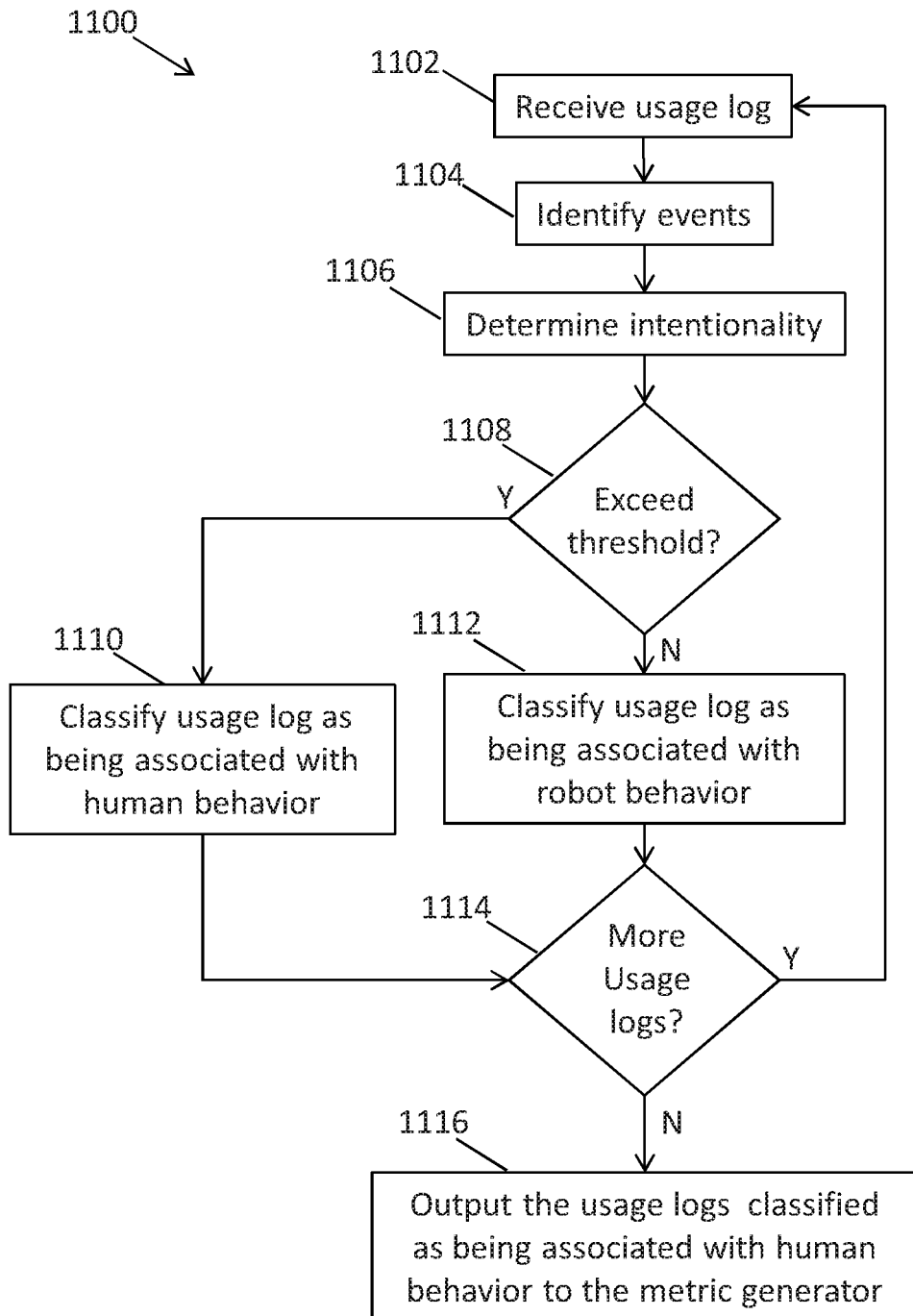
FIG. 11 is a flowchart illustrating another exemplary process for distinguishing between usage logs indicative of human behavior and usage logs indicative of automated software robot behavior in an information retrieval system.

FIG. 11 is a flowchart illustrating an exemplary process 1100 for distinguishing between usage logs indicative of human behavior and usage logs indicative of automated software robot behavior in an information retrieval system. At step 1102, a usage log is received by the log classifier. At step 1104, the log classifier analyzes log entries in the usage log to identify events that occurred during the session associated with the usage log. At step 1106, the log classifier determines a level of intentionality associated with events represented in the usage log by log entries as described herein. If the level of intentionality exceeds a threshold value (step 1108), the usage log is classified as being associated with a human at step 1110. Otherwise, the usage log is classified as being associated with an automated software robot at step 1112. Regardless of whether the usage log is classified as being associated with a human or an automated software robot, the process 1100 continues at step 1114, to determine whether there are more usage logs to classify. If so, the process repeats from step 1102. If not, at step 1116, the second subset of usage logs is output to the metric generator for further processing as described herein.

Figure 12:
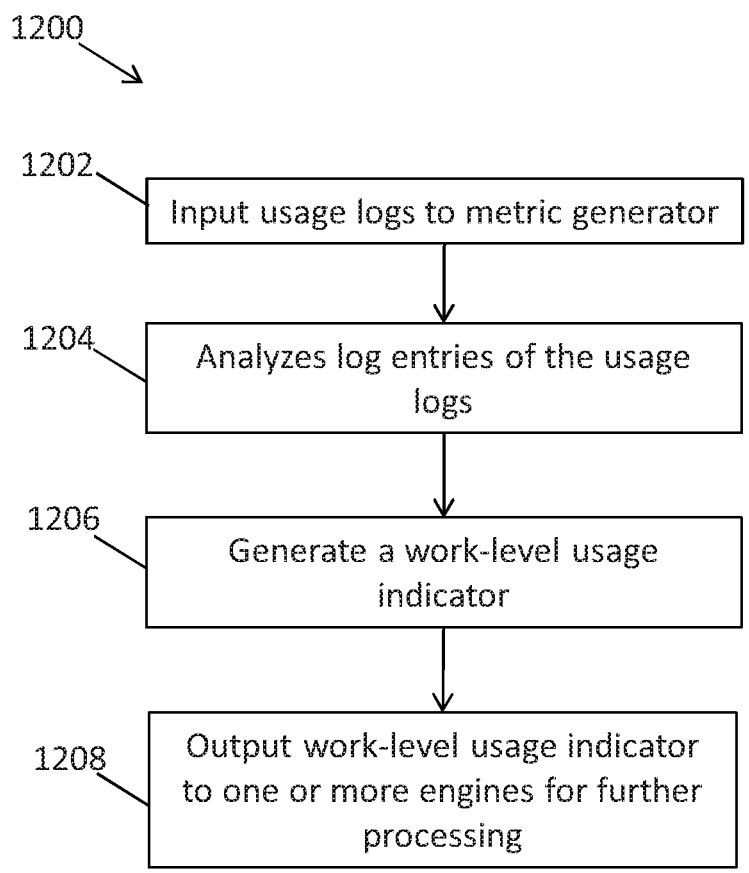
FIG. 12 is a flowchart illustrating process of generating one or more work-level (article-level) usage indicators.

FIG. 12 is a flowchart illustrating process 1200 of generating one or more work-level (e.g., article-level) usage indicators. At step 1202, usage logs that have been classified as being associated with human behavior are input to a metric generator. At step 1204, the metric generator analyzes the log entries of the usage log as described herein to identify works that were retrieved or otherwise accessed during the session represented by the log. At step 1206, the metric generator can generate a work-level usage indicator based at on a quantity of times a work was retrieved over a specified time period. At step 1208, the work-level usage indicator can be output to a forecast engine, a trending engine, a recommendation engine, and/or a ranking engine for further processing.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A method of cleansing data generated by one or more servers in response to database interactions resulting from an automated software robot interacting with the one or more servers via a network, the method comprising:
   receiving a first set of requests for one or more sets of data;
   retrieving metadata from a metadata database based on the first set of requests;
   embedding a link in the metadata to at least one full record associated with the metadata, the at least one full record being stored in a source database;
   receiving a second set of requests in response to actuation of the link embedded in the metadata;
   in response to receiving the second set of requests, retrieving from the source database, the at least one full record associated with the metadata;
   capturing, in a plurality of usage logs, each data structure executed in response to processing the first and second sets of requests;
   retrieving the plurality of usage logs from a non-transitory computer-readable medium, each of the plurality of usage logs including log entries corresponding to events that occurred during a session between a user device and the one or more servers, wherein the events include the second set of requests;
   processing the log entries in each of the plurality of usage logs in response to execution of a log analyzer to determine a relationship between the events that occurred during each session;
   executing the log analyzer to classify the plurality of usage logs based on the relationship as either corresponding to human behavior or automated software robot behavior; and
   in response to classification of one or more of the plurality of usage logs as corresponding to the automated software robot behavior, excluding the one or more of the plurality of usage logs from generation of a metric,
   wherein processing the log entries to determine the relationship includes measuring an intentionality associated with the events corresponding to the log entries based on determining, from the log entries, a quantity of search requests that were submitted during the session which did not result in a payoff event,
   wherein the metric is generated based on one or more of the plurality of usage logs that are classified as corresponding to human behavior, and
   wherein the one or more servers utilize the metric to adjust subsequent discovery of the metadata in the metadata database in response to search queries from each user device.

2. The method of claim 1, wherein the log entries correspond to investment events and payoff events, and analyzing the log entries to determine the relationship comprises determining an arrival rate of the payoff events.

3. The method of claim 2, wherein classifying the plurality of usage logs comprises determining whether the arrival rate of payoff events exceeds an arrival threshold.

4. The method of claim 1, wherein classifying the plurality of usage logs comprises determining whether a time between payoff events is substantially identical.

5. The method of claim 1, further comprising:
   generating cross references in the metadata database between the metadata based on the first and second sets of requests; and
   in response to the second set of requests to retrieve the at least one full record, in addition to retrieving the at least one full record from the source database, generating a separate database query to identify other full records based on the cross references in the metadata database between the metadata associated with the at least one full record and the metadata associated with the other full records.

6. A method of cleansing data generated by one or more servers in response to database interactions resulting from an automated software robot interacting with the one or more servers via a communications network, the method comprising:
   receiving a first set of requests for one or more sets of data;
   retrieving from metadata from a metadata database based on the first set of requests;
   embedding a link in the metadata to at least one full record associated with the metadata, the at least one full record being stored in a source database;
   receiving a second set of requests in response to actuation of the link embedded in the metadata;
   in response to receiving the second set of requests, retrieving from the source database the at least one full record associated with the metadata;
   capturing, in a plurality of usage logs, each data structure executed in response to processing the first and second set of requests;
   retrieving a plurality of usage logs from a non-transitory computer-readable medium, each of the plurality of usage logs including log entries corresponding to events that occurred during a session between a user device and the one or more servers, wherein the events include the second requests;
   processing the log entries in each of the plurality of usage logs in response to execution of a log analyzer to determine a relationship between the events that occurred during each session;
   executing the log analyzer to classify the plurality of usage logs based on the relationship as either corresponding to human behavior or automated software robot behavior; and
   in response to classification of one or more of the plurality of usage logs as corresponding to the automated software robot behavior excluding the one or more of the plurality of usage logs from generation of a metric,
   wherein processing the log entries to determine the relationship includes measuring an intentionality associated with the events corresponding to the log entries based on determining, from the log entries, a quantity of search requests that were submitted during the session which did not result in a payoff event,
   wherein the metric is generated based on one or more of the plurality of usage logs that are classified as corresponding to human behavior, wherein the one or more servers utilize the metric to adjust subsequent discovery of the metadata in the metadata database in response to search queries from each user device, and wherein determining the intentionality of at least one of the plurality of usage logs further comprises:

determining a natural log of a quantity of search requests that were submitted during the session which did not result in a payoff event; and multiplying the natural log of the quantity of search requests by a multiplication factor.

7. The method of claim 6, wherein the multiplication factor comprises a constant value divided by an arrival rate of payoff events in the at least one of the plurality of usage logs.

8. The method of claim 6, wherein determining the intentionality of the at least one of the plurality of usage logs further comprises:

dividing a product of the natural log of the quantity of search requests and the multiplication factor by a mathematical representation of an attention span of a human user.

9. The method of claim 1, wherein the plurality of usage logs are classified as corresponding to human behavior and the method further comprises:

generating a work-level usage metric based on the payoff events included in the one or more of the plurality usage logs classified as corresponding to human behavior.

10. The method of claim 9, further comprising generating forecast data based on the work-level usage metric.

11. The method of claim 9, further comprising generating trend data based on the work-level usage metric.

12. The method of claim 9, further comprising generating recommendation data based on the work-level usage metric.

13. The method of claim 9, further comprising generating rank data based on the work-level usage metric.

14. A system for cleansing data generated by one or more servers in response to database interactions resulting from an automated software robot interacting with the one or more servers via a network, the system comprising:

one or more servers;

a metadata database in communication with the one or more servers, the metadata database configured to store metadata;

a source database in communication with the one or more servers, the source database configured to store full records associated with the metadata stored in the metadata database; and a usage log database including usage logs associated with sessions between user devices and the one or more servers, the usage logs including log entries corresponding to events that occurred during sessions between user devices and the one or more servers, wherein the one or more servers are programmed to:

receive a first set of requests;

retrieve the metadata from the metadata database based on the first set of requests;

embed a link in the metadata to at least one of the full records in the source database;

receive a second set of requests in response to actuation of the links in embedded in each of the metadata;

in response to receiving the second set of requests, retrieve, from the source database, the at least one of the full records associated with the metadata;

capture, in a plurality of usage logs, each data structure executed in response to processing the first and second sets of requests, wherein the events include the second set of requests;

retrieve the usage logs from usage log database;

process the log entries in response to execution of a log analyzer to determine a relationship between the events that occurred during the session;

execute the log analyzer to classify each of the usage logs based on the relationship as either corresponding to human behavior or automated software robot behavior; and exclude one or more of the usage logs from generation of a metric in response to classification of the one or more usage logs as corresponding to the automated software robot behavior, wherein process the log entries to measure the relationship includes determining an intentionality associated with the events corresponding to the log entries based on determining, from the log entries, a quantity of search requests that were submitted during the session which did not result in a payoff event, wherein the metric is generated based on one or more of the usage logs that are classified as corresponding to human behavior, and wherein the one or more servers utilize the metric to adjust subsequent discovery of the metadata in the metadata database in response to search queries from each user device.

15. The system of claim 14, wherein the log entries correspond to investment events and payoff events, and the one or more servers are programmed to analyze the log entries to determine the relationship by determining an arrival rate of the payoff events.

16. The system of claim 15, wherein the one or more servers are programmed to classify each of the usage logs by determining whether the arrival rate of payoff events exceeds a rate threshold.

17. A system for cleansing data generated by one or more servers in response to database interactions resulting from an automated software robot interacting with the one or more servers via a network, the system comprising:

one or more servers;

a metadata database in communication with the one or more servers, the metadata database configured to store metadata;

a source database in communication with the one or more servers, the source database configured to store full records associated with the metadata in the metadata database; and a usage log database including usage logs associated with sessions between user devices and the one or more servers, the usage logs including log entries corresponding to events that occurred during sessions between user devices and the one or more servers, wherein the one or more servers are programmed to:

receive a first set of requests for one or more sets of data;

retrieve the metadata from the metadata database based on the first set of requests;

embed a link in the metadata to at least one of the full records associated with the metadata;

receive a second set of requests in response to actuation of the link embedded in the metadata;

in response to receiving the second set of requests, retrieve from the source database the at least one of the full records associated with the metadata;

capture, in a plurality of usage logs, each data structure executed in response to processing the first and second sets of requests, wherein the events include the second set of requests;
retrieve the usage logs from usage log database;
process the log entries in response to execution of a log analyzer to determine a relationship between the events that occurred during the session;
execute the log analyzer to classify each of the usage logs based on the relationship as either corresponding to human behavior or automated software robot behavior; and
exclude one or more of the usage logs from generation of a metric in response to classification of the one or more usage logs as corresponding to the automated software robot behavior,
wherein process the log entries to measure the relationship includes determining an intentionality associated with the events corresponding to the log entries based on determining, from the log entries, a quantity of search requests that were submitted during the session which did not result in a payoff event,
wherein the metric is generated based on one or more of the usage logs that are classified as corresponding to human behavior, and
wherein the one or more servers utilize the metric to adjust subsequent discovery of the metadata in the metadata database in response to search queries from each user device,
wherein the one or more servers are programmed to executing code to evaluate the following mathematical expression:

$$I(\pi_{s,t}) := \frac{20}{\lambda} \ln(V(\pi_{s,t})),$$

and
wherein $\pi_{s,t}$ denotes a payoff event during a session s, at a time t; $I(\pi_{s,t})$ is the intentionality associated with the payoff event; $V(\pi_{s,t})$ denotes a level of effort based on a number of search requests submitted by a user without a payoff event following the search requests; and $\lambda$ denotes the arrival rate of the payoff event.

18. The system of claim 14, wherein the one or more servers are configured to:
generate a work-level usage metric based on the payoff events included in the one or more of the usage logs that are classified as corresponding to human behavior; and
generating at least one of forecast data, trend data, recommendation data, or rank data based on the work-level usage metric.

19. A non-transitory computer-readable medium storing instructions, wherein execution of the instructions by a processing device causes the processing device to:
receive a first set of requests for one or more sets of data;
retrieve metadata from a metadata database based on the first set of requests;
embed a link in the metadata to at least one full record associated with the metadata;
receive a second set of requests in response to actuation of the links in embedded in the metadata;
in response to receiving the second set of requests, retrieve, from a source database, the at least one full record;
capture each data structure executed in response to processing the first and second sets of requests in a plurality of usage logs;
retrieve the usage logs from usage log database;
process the log entries in response to execution of a log analyzer to determine a relationship between events that occurred during the session, wherein the events include the second set of requests;
execute the log analyzer to classify each of the usage logs based on the relationship as either corresponding to human behavior or automated software robot behavior; and
exclude one or more of the usage log from generation of a metric in response to classification of the usage log as corresponding to the automated software robot behavior,
wherein process the log entries to measure the relationship includes determining an intentionality associated with the events corresponding to the log entries based on determining, from the log entries, a quantity of search requests that were submitted during the session which did not result in a payoff event,
wherein the metric is generated based on one or more of the plurality of usage logs that are classified as corresponding to human behavior, and
wherein the one or more servers utilize the metric to adjust subsequent discovery of the metadata in the metadata database in response to search queries from each user device.

* * * * *